US011210721B1

(12) United States Patent
Feng et al.

(10) Patent No.: US 11,210,721 B1
(45) Date of Patent: Dec. 28, 2021

(54) CONVERTING ITEMS INTO VECTORS TO DETERMINE OPTIMIZED LOCATIONS

(71) Applicant: Square, Inc., San Francisco, CA (US)

(72) Inventors: David Feng, Emeryville, CA (US); Christopher Skeels, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 256 days.

(21) Appl. No.: 16/160,564

(22) Filed: Oct. 15, 2018

(51) Int. Cl.
G06Q 30/06 (2012.01)
G06N 20/00 (2019.01)

(52) U.S. Cl.
CPC ......... G06Q 30/0631 (2013.01); G06N 20/00 (2019.01); G06Q 30/0633 (2013.01)

(58) Field of Classification Search
CPC ................................ G06Q 30/00; G06Q 30/06
See application file for complete search history.

(56) References Cited

U.S. PATENT DOCUMENTS

| | | |
|---|---|---|
| 5,583,763 A | 12/1996 | Atcheson et al. |
| 5,679,943 A | 10/1997 | Schultz et al. |
| 6,128,415 A | 10/2000 | Hultgren, III et al. |
| 6,430,539 B1 | 8/2002 | Lazarus et al. |
| 6,839,682 B1 | 1/2005 | Blume et al. |
| 7,092,929 B1 | 8/2006 | Dvorak et al. |
| 7,165,037 B2 | 1/2007 | Lazarus et al. |
| 7,769,640 B2 | 8/2010 | Klenske |
| 7,857,212 B1 | 12/2010 | Matthews |
| 8,055,548 B2 | 11/2011 | Staib et al. |
| 8,231,055 B2 | 7/2012 | Wen |
| 8,297,507 B2 | 10/2012 | Kayani |
| 8,302,860 B2 | 11/2012 | McKelvey |
| 8,504,455 B1 | 8/2013 | Balestreire et al. |

(Continued)

FOREIGN PATENT DOCUMENTS

WO 2015/081002 A1 6/2015

OTHER PUBLICATIONS

Skeels, Christopher et al., "Caviar's Word2Vec tagging for menu item recommendations", Square corner Blob, dated Jan. 29, 2018. (Year: 2018).*

(Continued)

Primary Examiner — Mark A Fadok
(74) Attorney, Agent, or Firm — Lee & Hayes, P.C.

(57) ABSTRACT

Generating a vector space model to analyze menu items for restaurants in order to determine optimized geographic locations for merchants to position restaurants is described herein. In one example, the techniques include converting the menu items into vectors using the vector space model, and using the vectors, grouping or assigning the menu items to cuisine types. Once assigned to cuisine types, one or more servers of a food-ordering service may analyze transaction histories for customers in a particular geographic area to determine how "adventurous" the customers are, or how diverse the customer's orders are amongst cuisine types. If the customers in a particular geographic area are adventurous or diverse consumers, the food-ordering service may recommend that a merchant establish a dine-in restaurant in the geographic area, offer food delivery to the geographic area, and/or include the geographic area in a schedule for a mobile restaurant.

18 Claims, 12 Drawing Sheets

(56) References Cited

U.S. PATENT DOCUMENTS

| | | | |
|---|---|---|---|
| 8,584,940 B2 | 11/2013 | Mesaros | |
| 8,700,060 B2 | 4/2014 | Huang | |
| 8,805,090 B1 | 8/2014 | Yagnik et al. | |
| 9,135,629 B2 | 9/2015 | Simeonov | |
| 9,424,590 B2 | 8/2016 | Gerard | |
| 9,697,531 B1 | 7/2017 | Bourget | |
| 10,140,623 B1 | 11/2018 | Lloyd et al. | |
| 10,802,745 B1 | 10/2020 | Bozicevich et al. | |
| 2001/0014868 A1 | 8/2001 | Herz et al. | |
| 2001/0018665 A1 | 8/2001 | Sullivan et al. | |
| 2001/0047308 A1 | 11/2001 | Kaminsky et al. | |
| 2002/0073304 A1 | 6/2002 | Marsh et al. | |
| 2003/0004739 A1 | 1/2003 | Mcever | |
| 2003/0132298 A1 | 7/2003 | Swartz et al. | |
| 2004/0059658 A1 | 3/2004 | Sosville | |
| 2004/0198389 A1 | 10/2004 | Alcock et al. | |
| 2004/0243468 A1 | 12/2004 | Cohagan et al. | |
| 2005/0010702 A1 | 1/2005 | Saito et al. | |
| 2005/0015333 A1 | 1/2005 | Schwerin-Wenzel et al. | |
| 2005/0060245 A1 | 3/2005 | Hoffman et al. | |
| 2005/0139662 A1 | 6/2005 | Eglen et al. | |
| 2005/0234763 A1 | 10/2005 | Pinto et al. | |
| 2006/0229806 A1 | 10/2006 | Forlenza et al. | |
| 2006/0229996 A1 | 10/2006 | Keithley et al. | |
| 2007/0016494 A1 | 1/2007 | Brown et al. | |
| 2007/0063048 A1 | 3/2007 | Havens et al. | |
| 2007/0130090 A1 | 6/2007 | Staib et al. | |
| 2008/0027818 A1 | 1/2008 | Broadhead | |
| 2008/0082373 A1 | 4/2008 | Durocher et al. | |
| 2009/0033491 A1 | 2/2009 | Saunders | |
| 2009/0090783 A1 | 4/2009 | Killian et al. | |
| 2009/0164330 A1 | 6/2009 | Bishop et al. | |
| 2009/0249342 A1 | 10/2009 | Johnson | |
| 2009/0271275 A1 | 10/2009 | Regmi et al. | |
| 2010/0153174 A1 | 6/2010 | Angell et al. | |
| 2010/0202339 A1 | 8/2010 | Chieng et al. | |
| 2010/0241838 A1 | 9/2010 | Cohen et al. | |
| 2010/0280880 A1 | 11/2010 | Faith et al. | |
| 2010/0323716 A1 | 12/2010 | Jaffri | |
| 2011/0004506 A1 | 1/2011 | May et al. | |
| 2011/0015987 A1 | 1/2011 | Chakraborty et al. | |
| 2011/0231257 A1 | 9/2011 | Winters | |
| 2011/0238538 A1 | 9/2011 | Allison, Jr. et al. | |
| 2011/0282733 A1 | 11/2011 | Gnanasambandam et al. | |
| 2011/0302013 A1 | 12/2011 | Dance et al. | |
| 2012/0026018 A1 | 2/2012 | Lin | |
| 2012/0094639 A1 | 4/2012 | Carlson et al. | |
| 2012/0095870 A1 | 4/2012 | McKelvey | |
| 2012/0101894 A1 | 4/2012 | Sterling et al. | |
| 2012/0239524 A1 | 9/2012 | Ouimet et al. | |
| 2012/0278172 A1 | 11/2012 | Mercuri et al. | |
| 2012/0290553 A1 | 11/2012 | England et al. | |
| 2012/0296702 A1 | 11/2012 | Fontana et al. | |
| 2012/0303425 A1 | 11/2012 | Katzin et al. | |
| 2012/0310687 A1 | 12/2012 | Carter | |
| 2012/0310732 A1 | 12/2012 | Heiser, II et al. | |
| 2012/0323663 A1 | 12/2012 | Leach | |
| 2013/0054367 A1 | 2/2013 | Grigg et al. | |
| 2013/0066740 A1 | 3/2013 | Ouimet et al. | |
| 2013/0117086 A1 | 5/2013 | Mesaros | |
| 2013/0124263 A1 | 5/2013 | Amaro et al. | |
| 2013/0132140 A1 | 5/2013 | Amin et al. | |
| 2013/0132246 A1 | 5/2013 | Amin et al. | |
| 2013/0132887 A1 | 5/2013 | Amin et al. | |
| 2013/0137367 A1 | 5/2013 | Fisher | |
| 2013/0138492 A1 | 5/2013 | Delgado et al. | |
| 2013/0166398 A1 | 6/2013 | Minde | |
| 2013/0197949 A1* | 8/2013 | Dermer | G06Q 50/12 705/5 |
| 2013/0246207 A1 | 9/2013 | Novak et al. | |
| 2013/0246301 A1 | 9/2013 | Radhakrishnan et al. | |
| 2013/0346201 A1 | 12/2013 | Bilange | |
| 2013/0346221 A1 | 12/2013 | Rangachari et al. | |
| 2014/0019211 A1 | 1/2014 | Chen et al. | |
| 2014/0089193 A1 | 3/2014 | Boding et al. | |
| 2014/0108209 A1 | 4/2014 | Lo Faro | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0138435 A1 | 5/2014 | Khalid | |
| 2014/0149251 A1 | 5/2014 | Stockwell | |
| 2014/0164192 A1 | 6/2014 | Brown et al. | |
| 2014/0172476 A1 | 6/2014 | Goulart | |
| 2014/0180767 A1 | 6/2014 | Villars | |
| 2014/0207524 A1 | 7/2014 | Just | |
| 2014/0207614 A1 | 7/2014 | Ramaswamy et al. | |
| 2014/0207626 A1 | 7/2014 | Braxton | |
| 2014/0213300 A1 | 7/2014 | Spears et al. | |
| 2014/0229323 A1 | 8/2014 | Or et al. | |
| 2014/0278799 A1 | 9/2014 | McLean | |
| 2014/0278804 A1 | 9/2014 | Lanxner et al. | |
| 2014/0279185 A1 | 9/2014 | Merz et al. | |
| 2014/0316888 A1 | 10/2014 | Villars | |
| 2014/0365301 A1 | 12/2014 | Rappoport et al. | |
| 2015/0081349 A1 | 3/2015 | Johndrow et al. | |
| 2015/0081418 A1 | 3/2015 | Sahai | |
| 2015/0100383 A1 | 4/2015 | Chauhan | |
| 2015/0142785 A1* | 5/2015 | Roberts | G06F 16/24578 707/723 |
| 2015/0149254 A1 | 5/2015 | Sakamoto | |
| 2015/0193784 A1 | 7/2015 | Gao et al. | |
| 2016/0260071 A1 | 9/2016 | Bechakas | |
| 2017/0262748 A1* | 9/2017 | Lettow | G06K 19/07773 |
| 2017/0262784 A1* | 9/2017 | Lowery | G06Q 30/0267 |
| 2017/0364836 A1* | 12/2017 | Li | G06Q 50/12 |
| 2018/0365718 A1* | 12/2018 | Sprecher | G06F 16/26 |
| 2019/0236148 A1* | 8/2019 | DeFelice | G06F 40/56 |

OTHER PUBLICATIONS

Square press release, "Square Completes Sale of Caviar to Doordash", suareup.com, dated Nov. 1, 2019. (Year: 2019).*

Mitchell, Nicole et al, "Using Word2Vec to Power Recommendation Engine", The Corner, dated Aug. 31, 2017. (Year: 2017).*

Guoxing, Li et al., "Restaurant Manu Generation From User Reviews", Stanford University, Dated: Jun. 24, 2015. (Year: 2015).*

Grbovic, Mihajlo, "Ecommerce in your inbox: product recommendation at scale", Yahoo Labs, dated Jun. 23, 2016 (Year: 2016).*

Lin, Xiangyi et al., "Multi-criteria GIS-based procedure for coffee shop location decision", Akadem for Teknik Och Miljo, Dated Jun. 2013. (Year: 2013).*

Brown R.L., "Strategies for Successfully Buying or Selling a Business," The Business Book Press, RDS Associates INC, 222 pages (2002).

Final Office Action dated Jun. 26, 2019, for U.S. Appl. No. 14/529,687, of Lloyd, L.J., et al., filed Oct. 31, 2014.

Final Office Action dated Jun. 26, 2019, for U.S. Appl. No. 16/177,068, of Grodin, S., et al., filed Oct. 31, 2018.

Non Final Office Action dated Sep. 12, 2019, for U.S. Appl. No. 15/789,678, of Cziraky-Stanley, C., et al., filed Oct. 20, 2017.

Advisory Action dated Sep. 16, 2019, for U.S. Appl. No. 14/529,687, of Lloyd, L.J., et al., filed Oct. 31, 2014.

Non Final Office Action dated Nov. 27, 2019, for U.S. Appl. No. 16/177,068, of Grodin, S., et al., filed Oct. 31, 2018.

Chu, C., and Zhang, G.P., "A comparative study of linear and nonlinear models for aggregate retail sales forecasting," International Journal of Production Economics, vol. 86, Issue 3, pp. 217-231 (Dec. 11, 2003).

Frank, C., et al., "Forecasting women's apparel sales using mathematical modeling," International Journal of Clothing Science and Technology, vol. 15, Issue 2, pp. 107-125 (2003).

Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.

"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.

Non-Final Office Action dated Sep. 10, 2015, for U.S. Appl. No. 14/032,585, of Bourget, E.W., filed Sep. 20, 2013.

(56) References Cited

OTHER PUBLICATIONS

Final Office Action dated Mar. 23, 2016, for U.S. Appl. No. 14/032,585, of Bourget, E.W., filed Sep. 20, 2013.
Non-Final Office Action dated Apr. 22, 2016, for U.S. Appl. No. 14/133,517, of Wolter, J., filed Dec. 18, 2013.
Non-Final Office Action dated Jul. 29, 2016, for U.S. Appl. No. 14/032,585, of Bourget, E.W., filed Sep. 20, 2013.
Non-Final Office Action dated Dec. 2, 2016, for U.S. Appl. No. 14/133,517, of Wolter, J., filed Dec. 18, 2013.
Notice of Allowance dated Jan. 27, 2017, for U.S. Appl. No. 14/032,585, of Bourget, E.W., filed Sep. 20, 2013.
Non-Final Office Action dated Jun. 7, 2017, for U.S. Appl. No. 14/529,687, of Lloyd, L.J., et al., filed Oct. 31, 2014.
Final Office Action dated Jun. 12, 2017, for U.S. Appl. No. 14/133,517, of Wolter, J., filed Dec. 18, 2013.
Non-Final Office Action dated Jul. 13, 2017, for U.S. Appl. No. 14/529,752, of Lloyd, L.J., et al., filed Oct. 31, 2014.
Non-Final Office Action dated Nov. 9, 2017, for U.S. Appl. No. 14/524,684 of Lloyd, L.J., et al., filed Oct. 27, 2014.
Non-Final Office Action dated Nov. 15, 2017, for U.S. Appl. No. 14/133,517, of Wolter, J., filed Dec. 18, 2013.
Final Office Action dated Jan. 10, 2018, for U.S. Appl. No. 14/529,687, of Lloyd, L.J., et al., filed Oct. 31, 2014.
Final Office Action dated Feb. 9, 2018, for U.S. Appl. No. 14/529,752, of Lloyd, L.J., et al., filed Oct. 31, 2014.
Final Office Action dated Apr. 10, 2018, for U.S. Appl. No. 14/524,684 of Lloyd, L.J., et al., filed Oct. 27, 2014.
Advisory Action dated May 3, 2018, for U.S. Appl. No. 14/529,752, of Lloyd, L.J., et al., filed Oct. 31, 2014.
Final Office Action dated May 14, 2018, for U.S. Appl. No. 14/133,517, of Wolter, J., filed Dec. 18, 2013.
Advisory Action dated Jun. 18, 2018, for U.S. Appl. No. 14/524,684 of Lloyd, L.J., et al., filed Oct. 27, 2014.
Non-Final Office Action dated Jul. 13, 2018, for U.S. Appl. No. 14/529,752, of Lloyd, L.J., et al., filed Oct. 31, 2014.
Notice of Allowance dated Jul. 20, 2018, for U.S. Appl. No. 14/524,684 of Lloyd, L.J., et al., filed Oct. 27, 2014.
Non-Final Office Action dated Dec. 3, 2018, for U.S. Appl. No. 14/529,687, of Lloyd, L.J., et al., filed Oct. 31, 2014.
Final Office Action dated Feb. 8, 2019, for U.S. Appl. No. 14/529,752, of Lloyd, L.J. et al. filed Oct. 31, 2014.
Non Final Office Action dated Mar. 14, 2019, for U.S. Appl. No. 16/177,068, of Grodine, S. filed Oct. 31, 2018.
International Search Report and Written Opinion, for International Application No. PCT/US2014/067074, dated Mar. 10, 2015.
Final Office Action dated Mar. 9, 2020, for U.S. Appl. No. 15/789,678, of Cziraky-Stanley, C., et al., filed Oct. 20, 2017.
Final Office Action dated Mar. 9, 2020, for U.S. Appl. No. 16/177,068, of Grodin, S., et al., filed Oct. 31, 2018.
Advisory Action dated May 19, 2020, for U.S. Appl. No. 16/177,068, of Grodin, S., et al., filed Oct. 31, 2018.
Advisory Action dated Jun. 15, 2020, for U.S. Appl. No. 15/789,678, of Cziraky-Stanley, C., et al., filed Oct. 20, 2017.
Non-Final Office Action dated Jun. 23, 2020 for U.S. Appl. No. 16/162,984 of Lloyd, L.J., et al., filed Oct. 17, 2018.
Non Final Office Action dated Apr. 27, 2021, for U.S. Appl. No. 16/999,343, of Cziraky-Stanley, C., et al., filed Aug. 21, 2020.
Final Office Action dated Aug. 23, 2021, for U.S. Appl. No. 16/999,343, of Cziraky-Stanley, C., et al., filed Aug. 21, 2020.

* cited by examiner

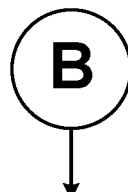

IDENTIFY, BASED AT LEAST IN PART ON THE TAGGED ITEMS, A FIRST MENU OF A FIRST MERCHANT THAT INCLUDES FIRST ITEMS OF A SAME CUISINE TYPE AS SECOND ITEMS INCLUDED IN A SECOND MENU OF A SECOND MERCHANT
502

IDENTIFY AT LEAST ONE OF THE FIRST ITEMS INCLUDED IN THE FIRST MENU THAT IS NOT INCLUDED IN THE SECOND MENU
504

IDENTIFY, FROM THE FIRST MENU, A PRICE ASSOCIATED WITH THE AT LEAST ONE OF THE FIRST ITEMS
506

PROVIDE ANOTHER RECOMMENDATION TO ANOTHER MERCHANT DEVICE ASSOCIATED WITH THE SECOND MERCHANT TO ADD THE AT LEAST ONE OF THE FIRST ITEMS TO THE SECOND MENU AND A SUGGESTED PRICE FOR THE AT LEAST ONE OF THE FIRST ITEMS
508

FIG. 5

CONVERTING ITEMS INTO VECTORS TO DETERMINE OPTIMIZED LOCATIONS

BACKGROUND

Merchants that operate stores, such as traditional dine-in restaurants, are now more easily able to provide delivery using ordering services. For example, food-ordering services can provide applications with which customers can view menus for delivery restaurants, place orders to purchase items from the delivery restaurants, and have the items delivered to their homes. Using these food-ordering services, customers are able to easily order items from a variety of delivery restaurants, and choose from among a variety of cuisine types, without leaving the comfort of their homes. While these food-ordering services help connect customers to restaurants, the merchants operating such restaurants are often unaware of the geographic locations where their items are being delivered.

To simplify the food-ordering process for the customers and the merchants, these food-ordering services often process the transactions on behalf of the merchants. Thus, the food-ordering services have access to various data such as transaction histories for customers, delivery locations for the customers, number and type of items purchased by the customers, frequency of purchases by the customers, and delivery restaurants from which customers order. While this data can be helpful for merchants to more effectively identify and serve their customer base, analyzing the data is often resource and time intensive.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 5 illustrates an example process for utilizing a vector space to analyze menu items to recommend a menu item for a merchant as described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
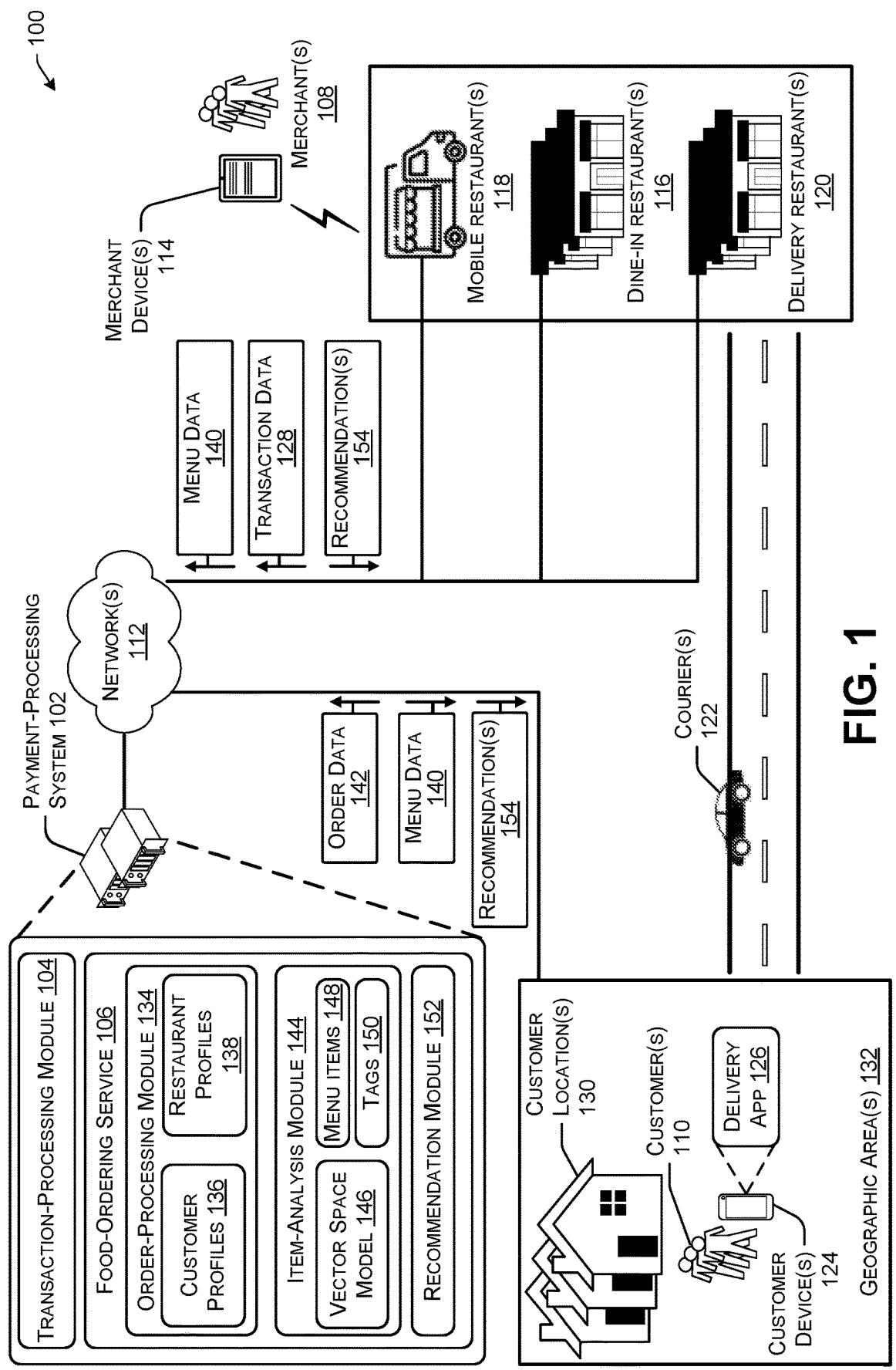
FIG. 1 illustrates an example system for generating and utilizing a vector space model to analyze menu items for delivery restaurants in order to provide, among other recommendations, a recommendation for an optimized geographic location for a merchant to establish a restaurant.

Techniques described herein are directed to generating a vector space model to analyze items offered for delivery in order to determine optimized geographic locations for merchants to establish stores. For example, food-ordering services receive menus for restaurants that include listings of items that are offered by the delivery restaurant to customers. Techniques described herein include converting the items into vectors using a vector space model, and using the vectors, grouping or assigning the items to cuisine types. Once assigned to cuisine types, the food-ordering service may analyze transaction histories for customers in a particular geographic area to determine how "adventurous" the customers are, or how diverse the customer's orders are amongst cuisine types. If the customers in a particular geographic area are adventurous or diverse in their consumption, the food-ordering service may recommend that a merchant establish a dine-in restaurant in the geographic area, offer food delivery to the geographic area, and/or include the geographic area in a schedule for a mobile restaurant.

Delivery restaurants may provide menus to food-ordering services that include items (e.g., food, drinks, etc.) offered for delivery to the customers. In this way, customers can use their personal devices to access applications offered by the food-ordering services to browse menus for delivery restaurants, place orders to purchase items offered by the delivery restaurants, and have the items delivered to their homes. Due to the number of delivery restaurants, food-delivery services may receive menus for delivery restaurants that offer items across various cuisine types, and also menus for delivery restaurants that offer items from overlapping cuisine types. In order to determine how adventurous customers are in a geographic area, or how diverse the customers are in their item consumption, food-ordering services may attempt to tag, group, or otherwise assign items to generic groupings, such as cuisine types (e.g., Italian food, Pizza, Thai food, Chinese food, etc.) and/or by dietary restrictions (e.g., gluten free, vegan, vegetarian, etc.). In this way, the food-delivery services may determine that customers in a particular geographic area order items from many different cuisine types, and across diverse cuisine types (e.g., sushi is diverse from pizza). Additionally, the food-delivery services may determine that customers in a particular geographic area order items from a particular cuisine type, which may be helpful when recommending that a particular merchant ought to establish a restaurant that offers menu items from that particular cuisine type.

While the delivery restaurants often provide menus that include text-based listings of their items, the names of items listed in the menus can be unique to the restaurants (e.g., "David's Famous Chops") and difficult to assign to a particular cuisine type. For instance, one particular pizza restaurant may offer pepperoni pizza on their menu and name it "Pete's Famous Pepperoni Pizza," and another pizza restaurant may offer pepperoni pizza on their menu and name it "Pepperoni Pie." In examples such as these, various issues may arise when using computing device to process and tag items as belonging to particular cuisine types, such as determining whether "Pie" corresponds to Pizza cuisine, or a Dessert cuisine. Further, traditional methods for utilizing computing devices to assign or tag menu items, such as string matching and text classification, may experience difficulties such as collecting and maintaining useful, accurate taggings. Further, string matching rules may not scale well as they have to be hand-crafted and evolve over time in light of exceptions being found. Additionally, unsupervised machine learning methods, such as clustering and similarity search, may be insufficient alone. For example, clustering algorithms may need manual inputs, such as tags for the clusters that are produced as well as a number of clusters to produce.

The techniques described herein include converting menu items and generic names of items, or "tags" (such as cuisine types, dietary restrictions, etc.) into comparable items, and using similarity search to automatically classify menu items with the tags most similar to them. For example, the techniques described herein may include transforming or converting the text-based representations of the menu items and the tags into fixed-length numeric vectors that can be compared using algebraic methods, such as cosine similarity and/or Euclidian distance, to determine which tag is most similar to, and thus most appropriate for, the different menu items.

In order to convert or transform the menu items and the tags into numeric vectors, a food-ordering service may initially train a vector space model using a corpus of text that includes individual words. The corpus of text may be any type of corpus obtained from various sources, such as digital encyclopedias and/or dictionaries, digital news sites, and/or the listings of the menu items themselves. The food-ordering service may utilize a machine-learning (ML), word embedding technique that learns a vector space model from the corpus of text such that related words are closer in the vector space than non-related words. In this way, similarity comparisons and vector algebra may be used on concepts inherent in the words themselves. For example, the vector space model may position a vector for the word "sandwich" closer in space to a vector for the word "hamburger" compared to a vector for the word "noodles." Various techniques may be utilized for training or learning the vector space model, such as Word2Vec, Doc2Vec, fastText, Global Vectors for Word Representation (GloVe), or any other technique for obtaining vector representations for words.

The food-ordering service may create, identify, or otherwise compile sets of tags such as cuisine types ("Pizza," "Burger," and "Thai Curry"), and dietary restriction (e.g. "Vegetarian," "Vegan," and "Gluten Free") such that a tag exists for each of the menu items to be classified or tagged. In some examples, the tags may be single-word tags, and in other examples, the tags may be multi-word tags that capture broader concepts (e.g., "Cake Cookies Pie") and match menu items beyond just those listed in the tag (e.g., match cupcake and donut items for "Cake Cookies Pie").

In order to compare the menu items to the tags for cuisine types, the food-ordering service may use the vector space model to convert the menu items into first numeric vectors, and convert the tags into second numeric vectors. The food-ordering service may then compare the first vectors and the second vectors to determine similarity scores between individual vectors of the first vectors and the second vectors. For example, the food-ordering service may utilize cosine similarity, Euclidean distance, and/or any other algebraic or mathematic formula to determine similarity scores or measurements between vectors. The food-ordering service may then use the similarity scores to assign each of the menu items with a tag to which the menu items are most similar. In this way, each of the menu items may be assigned a tag or identified as being included in a particular cuisine type and/or dietary restriction.

Once the menu items have been classified or tagged as belonging to a particular cuisine type (and/or other grouping), various operations can be performed by the food-ordering service. For example, the food-ordering service may analyze transaction histories for a group of customers receiving deliveries in a geographic area (e.g., city, zip code, neighborhood, etc.) to identify a number of the tagged items purchased by each customer in the group of the customers. The food-ordering service can then determine, based on the number of the tagged items, "adventurous" or "diversity" scores which indicate how diverse the customers in the geographic area are with respect to item consumption. The diversity scores may be based on number of tagged items that have been ordered by the customers, as well as the diversity or differences between the tagged items. For example, a customer that has only ordered items from two different tags or groups (e.g., Pizza tag and Hamburger tag) may have a lower diversity score than a customer that has ordered items from four different tags or groups (e.g., Italian tag, Hamburger tag, Mexican Tag, and Pizza tag). Additionally, a customer that has ordered items that belong to tags that are much different by having vectors that are further apart in the vector space model (e.g., Steak tag versus Vegetarian tag) may have a higher diversity score than a customer that orders items that belong to tags having vectors that are closer together in the vector space model (e.g., Calzone tag versus Pizza tag). Once the food-ordering service has calculated the diversity scores for each customer in a geographic area, the food-ordering service may determine an aggregate diversity score for the geographic area that indicates how adventurous or diverse the customer's in that geographic area are as a group. If the geographic area has a higher aggregate diversity score, the food-ordering service may provide a recommendation to a merchant that the merchant establish a restaurant in the geographic area. Conversely, if the geographic area has a lower aggregate diversity score, the food-ordering service may refrain from recommending the geographic area as a favorable location for a restaurant.

In some examples, the diversity scores may be utilized to identify geographic areas that include customers that primarily eat from a few cuisine types, rather than many cuisine types. For instance, if diversity scores for a geographic area are relatively low, it may be determined that the customers are connoisseurs of a few particular cuisine types, and that recommendations should be provided to merchants that operate restaurants with items from those cuisine types. For instance, a particular geographic area may be near a college campus and have a customer base of primary students who often order pizza. In such an example, the food-ordering service may provide recommendations to merchants that operate restaurants that provide pizza may to establish a restaurant in the area.

The food-ordering service may perform additional, or alternative operations, using the tagged menu items. For example, the food-ordering service may determine that a merchant operates a delivery restaurant with items that primarily belong to a particular tag or cuisine type. Using the tagged menu items and transaction histories for customers, the food-ordering service may determine that the merchant does not offer a popular menu item from the particular tag or cuisine type offered by other restaurants and recommend that the merchant include the popular menu item in their menu. Additionally, the food-ordering service may analyze menus of restaurants that do offer the popular menu item to determine an average price of the menu item and recommend a price for the popular menu item if the merchant chooses to add the item to their menu. As another example, the food-ordering service may more intelligently group restaurants and/or menus in their application for customers to browse, and also more intelligently recommend items to customers. For instance, if a particular customer commonly orders items belonging to a particular tag or cuisine type, such as Pizza, the food-ordering service may use to vector space model to identify vectors that are close in space to the particular tag and surface recommendations to that customer for other, similar cuisine types, such as Calzones.

As described above, the techniques described herein are directed to converting or transforming menu items and tags into numeric vectors to enable comparisons between words to identify similarities. Previously, computing devices were unable to identify contextual similarities between menu items that did not have matching text or text strings. For instance, a computing device would be unable to discern that a menu item offered by a Pizza restaurant for "Fig Pie" belongs to a Pizza cuisine/tag rather than a Dessert cuisine/tag. Additionally, computing devices previously have been unable to determine similar menu items based on the text-based representations. For instance, computing devices are unable to analyze text and determine that "Pizza" is more similar to "Calzone," and less similar to "Sushi." However, by generating and utilizing a vector space model to represent menu items as numeric vectors, computing devices are enabled to use mathematical formulas or algorithms to determine similarities amongst menu items and cuisine types, and perform more intelligent operations that previously could not be performed by computing devices.

While the techniques described herein are with respect to menu items for restaurants, and identifying favorable locations to establish restaurants and/or provide deliveries of items, the techniques are equally applicable to other industries. For instance, transaction data for other goods and/or service industries (e.g., day spa, hair cutting, dog walking, etc.) may be analyzed to determine a favorable location to establish a business. As a specific example, transaction data for day spas may be analyzed to determine that customers in a particular geographic area utilize services from day spas at a higher rate than other geographic locations, and that the particular geographic area is a favorable location to establish a new day spa. Accordingly, the techniques described herein are applicable to other industries or businesses.

FIG. 1 illustrates an example system 100 in which a food-ordering service generates and utilizes a vector space model to analyze menu items for delivery restaurants in order to provide, among other recommendations, a recommendation for an optimized geographic location for a merchant to establish a restaurant. In some examples, a payment-processing system 102 may include or be associated with a transaction-processing module 104 and a food-ordering service 106 for providing various services to merchants 108 and customers 110. The payment-processing system 102 may include one or more computing devices, such as server devices, that are arranged and configured to communicate with other devices as distributed computing resources. The payment-processing system 102 may include a variety of device types configured to communicate with other devices over one or more networks 112 and are not limited to a particular type of device.

The payment-processing system 102 may include the transaction-processing module 104 to provide services to merchants 108 and customers 110, such as performing transactions between the merchants 108 and customers 110 of the merchants 108. The transactions performed on behalf of the merchants 108 may be initiated at or by one or more merchant devices 114. As used in herein, merchant devices 114 may comprise any sort of mobile or non-mobile devices (e.g., electronic devices) that include instances of application(s) that execute on the respective merchant devices 114. The application(s) may provide POS functionality to the merchant devices 114 to enable merchants 108 (e.g., owners, employees, etc.) to at least accept payments from the customers 110. In some types of businesses, the merchant devices 114 may correspond to a dine-in restaurant 116, store, or other place of business of the merchants 108, and thus, may be a fixed location that typically does not change on a day-to-day basis. In other types of businesses, however, the location of the merchant devices 108 may change from time to time, such as in the case that the merchants 108 operate mobile restaurants 118 (such as a food truck), operate a pop-up stand (e.g., is a street vendor), is a cab driver, etc., or has an otherwise mobile business, e.g., in the case the merchants 108 sell items at buyer's homes, places of business, and so forth. Even further, the merchants 108 may operate delivery restaurants 120 that deliver items or goods to customers 110 using one or more couriers 122. In some examples, the dine-in restaurants 116 and/or mobile restaurants 118 may also function as delivery restaurants 120 in that items delivered from the dine-in restaurants 116 and/or mobile restaurants 118 to the customers 110.

As used herein, a merchant 108 may include any business engaged in the offering of items (e.g., goods) or services for acquisition by customers 104. Actions attributed to a merchant 108 may include actions performed by owners, employees, or other agents of the merchant 108, and thus no distinction is made herein unless specifically discussed. In addition, as used herein, a customer 110 may include any entity that acquires items or services from a merchant 108, such as by purchasing, renting, leasing, borrowing, licensing, or the like. Hereinafter, items and/or services offered by merchants 108 may be referred to solely as items. Thus, a merchant 108 and a customer 110 may interact with each other to conduct a transaction in which the customer 110 acquires an item from a merchant 108, and in return, the customer 110 provides payment to the merchant 108. While the items described herein are generally with respect to items offered by restaurants, the items can be any types of items.

As used herein, a transaction may include a financial transaction for the acquisition or obtaining of items and/or services that is conducted between customers 110 and merchants 108. In a dine-in restaurant 116 and/or mobile restaurant 118 example, when paying for a transaction, the customer 110 can provide the amount that is due to the merchant 108 using cash or other payment instrument (e.g., a debit card, a credit card, a stored-value or gift card, a check, through an electronic payment application on a device carried by the customer 110, or the like). The merchant 108 can interact with the merchant devices 114 to process the transaction, such as by inputting (e.g., manually, using a magnetic card reader or an RFID reader, etc.)

identifiers (e.g., payment information, such as a card number, account number, or any other account information) associated with the payment instrument. For example, a payment instrument of the customer 110 may include one or more magnetic strips for providing card and customer information when swiped in a card reader. In other examples, the payment instrument may include other types of payment cards may be used, such as smart cards having a built-in memory chip that is read by the device when the card is "dipped" into the reader, a radiofrequency identification tag, or so forth.

In some examples, such as in the example of the delivery restaurants 120, the customers 110 may utilize customer devices 124 and interact with a delivery application 126 associated with the food-ordering service 106. The customers 110 may input payment information into the delivery application 126 such that transactions may be performed via the delivery application 126 for items that are delivered to the customers 110 from the delivery restaurants 120.

In the above examples, the merchant devices 118 and/or customer devices 124 may send transaction data 128 to the payment-processing system 102 over the networks 112. In some examples, the transaction data 128 may generally represent details involving a payment transaction between the merchants 108 and customers 110.

During a transaction between a merchant 108 and a customer 110, the merchant devices 114 can determine the transaction data 128 describing the transaction, such as the payment information of the payment instrument, an amount of payment received from the customer 110, the items/service(s) acquired by the customer 110, a time, place and date of the transaction, a card network associated with the payment instrument, an issuing bank of the payment instrument, a name of the customer 110, and so forth. The merchant devices 114 can send the transaction data 128 to the payment service payment-processing system 102 over the networks 112, either substantially contemporaneously with the conducting of the transaction (in the case of online transactions) or later when the device is in the online mode (in the case offline transactions).

Generally, when a merchant 108 and a customer 110 enter an electronic payment transaction, the transaction is processed by electronically transferring funds from a financial account associated with the customer 110 to a financial account associated with the merchant 108. As such, the transaction-processing module 104 may communicate with one or more computing devices of a card network (or "card payment network"), e.g., MasterCard®, VISA®, over the network 112 to conduct financial transactions electronically. The transaction-processing module 104 can also communicate with one or more computing devices of one or more banks, processing/acquiring services, or the like over the network 112. For example, the transaction-processing module 104 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instruments to customers 110, and may pay acquiring banks for purchases made by customers 110 to which the issuing bank has issued the payment instruments. Accordingly, in some examples, the computing devices of an acquiring bank may be included in the card payment network and may communicate with the computing devices of a card-issuing bank to obtain payment. Further, in some examples, a customer 104 may use a debit card instead of a credit card, in which case, the bank computing devices of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In addition to the payment-processing service performed by the transaction-processing module 104, the payment-processing system 102 may further provide the food-ordering service 106. The food-ordering service 106 may comprise a food-delivery platform that allows or enables customers 110 to order food from delivery restaurants 120 of the merchants 108. Merchants 108 may register or enroll for use of the food-ordering service 106 such that customers 110 are able to order items from the merchant's 108 delivery restaurants 120 and have the items delivered from the delivery restaurants 120 to customer locations 130 located across different geographic areas 132 that are supported by the food-ordering service 104. For instance, the food-ordering service 106 may employ, hire, and/or contract various couriers 122 that transport items from the delivery restaurants 120 to the customer locations 130.

The food-ordering service 106 may include an order-processing module 134 that processes orders received from the customers 110. To process orders effectively from the customers 110, the customers 110 may create customer profiles 136 and the merchants 108 may create restaurant profiles 138. The customer profiles 136 may include various customer data, such as customer/delivery locations 130, contact information (e.g., phone numbers, email addresses, etc.), food data (e.g., preferences, allergies, etc.), dietary restrictions (e.g., religious, vegan, vegetarian, etc.), delivery data (e.g., day(s), time, special instructions for delivery, etc.), and/or payment data (e.g., payment instrument data, bank account data, etc.). Thus, a customer 110 may sign up for an account with the food-ordering service 106 and provide customer data, food data, delivery data, and/or payment data to the food-ordering service 106 for storage in a customer profile 136 associated with the customer 110 for future processing of an order request. In some examples, some or all of the customer data may be observed, or learned, overtime by the payment-processing system 102. For example, the payment-processing system 102 may learn or determine food data, dietary resections, delivery data, etc., based on transaction histories of the customers 110. For instance, if a customer 110 orders gluten free items, the payment-processing system 102 may learn or determine that the customer 110 does not consume gluten. Further, the payment-processing system 102 may determine that a customer generally orders deliveries to different locations on different days and/or at different times, and adjust delivery data accordingly. For instance, if a customer commonly orders delivers to a friend's house on Sundays, the payment-processing system 102 may learn this behavior and adjust the delivery location for the customer 110 on Sunday accordingly.

Similarly, the merchants 108 may register for restaurant profiles 138 such that the order-processing module 134 can process orders for items from the delivery restaurants 120. The restaurants profiles 138 may include various types of data, such as payment account information for the merchants 108 (e.g., to receive payments from customers 110, to pay for use of the food-ordering service 106, etc.), delivery restaurant 120 locations for use by couriers 122 and/or customers 110, geographic areas 132 that are serviced by the delivery restaurants 120, cuisine-type data, dietary-restriction data, hours/days of operation, and/or menu data 140. Generally, the menu data 140 may include names of items offered for sale via the food-ordering service 106 by the delivery restaurants 120, prices of the items, and/or other menu data 140. The menu items indicated in the menu data 140 may be in a text-based format and may include food items, drink items, and/or other items found on a menu of a restaurant. In this way, when the customers 110 utilize their delivery application 126, the menu data 140 for the merchants 108 may be sent to the customer devices 124 such that the customers may browse the menus of the delivery restaurants 120 and place orders by sending order data 142 to the food-ordering service 106 to be processed by the order-processing module 134. The order data 142 may indicate the delivery restaurant 120 from which the customers 110 wish to order items, the types of items, the quantity of the items, the delivery time, and so forth.

The order-processing module 134 may then process the order data 142 and help facilitate the orders on behalf of the merchants 108 and customers 110. For instance, the order-processing module 134 may send the order data 142 to the delivery restaurants 120 so the restaurants 120 may begin preparing the items in the order to be delivered by the requested time. Further, the order-processing module 134 may request that a courier 122 pick up the items from the delivery restaurants 120 at a particular time, and deliver the items to a specified customer location 130. Even further, the order-processing module 134 may charge customer accounts with the appropriate amounts of money for the items ordered, and credit merchant accounts for the costs of the items ordered. In this way, the order-processing module 134 may help facilitate a food-ordering service 106 by connecting customers 110 to merchants 108 and allowing customers 110 to order items from delivery restaurants 120 to be delivered to customer locations 130 without the customers 110 having to pick-up the items from the restaurants themselves.

According to the techniques described herein, the food-ordering service 106 may further include an item-analysis module 144 configured to generate and utilize one or more vector space models 146. Generally, the vector space model 146 is an algebraic model for representing text as vectors of identifiers, such as index terms. As described in more detail below, the item-analysis module 144 may utilize related models, such as machine-leaning (ML) models, to produce word embeddings. The item-analysis module 144 may obtain a corpus of text and produce the vector space model 146 such that each unique word in the corpus is assigned a corresponding vector in the space. Further, words that are related may be closer in the space than words that are not related or are less related. In the example of menu items, the vector for "sandwich" may be closer in the vector space to a vector for "wrap" than a vector for "sushi."

In some examples, the item-analysis module 144 may analyze menus items 148 (e.g., from the menu data 140) for the restaurants (e.g., mobile restaurants 118, dine-in restaurants 116, and delivery restaurants 120) along with tags 150 (e.g., cuisine types, dietary restrictions, etc.) using the vector space model 146. The menu items 148 may comprise text-based listings of one or more words representing items in the menu data 140 from the restaurants of the merchants 108. The tags 150 may comprise various generic names for the items, such as contextual groupings or classes. For example, the tags 150 may comprise cuisine types ("Pizza," "Burger," and "Thai Curry"), dietary restrictions, (e.g. "Vegetarian," "Vegan," and "Gluten Free"), and/or foods allowed by dietary laws (e.g., Kosher foods, lacto vegetarian foods, etc.). In some examples, the tags 150 may be single-word tags, and in other examples, the tags 150 may be multi-word tags that capture broader concepts (e.g., "Cake Cookies Pie") and match menu items beyond just those listed in the tag 150 (e.g., match cupcake and donut items for "Cake Cookies Pie").

Once the menu items 148 and the tags 150 are determined and stored, the item-analysis module 144 may utilize the vector space model 146 to generate vectors representing the menu items 148 and tags 150, and compare the vectors. For instance, to compare the menu items 148 with the tags 150, the item-analysis module 144 may use the vector space model 146 to convert the menu items 148 into first numeric vectors, and convert the tags 150 into second numeric vectors. The item-analysis module 144 may then compare the first vectors and the second vectors to determine similarity scores between individual vectors of the first vectors and the second vectors. For example, the item-analysis module 144 may utilize cosine similarity, Euclidean distance, and/or any other algebraic or mathematic formula to determine similarity scores or measurements between vectors. The item-analysis module 144 may then use the similarity scores to assign (or group) each of the menu items 148 with a tag 150 that the menu items 148 are most similar to. In this way, each of the menu items 148 may be assigned a tag 150, or identified as being included in a particular cuisine type and/or dietary restriction.

Once the menu items 148 are assigned tags 150, or otherwise grouped/classified, a recommendation module 152 may form various recommendations 154 and/or perform various actions. For example, the recommendation module 152 may analyze the transaction data 128 received over time for a group of the customers 110. The recommendation module 152 may identify a group of the customers 110 as belonging to a particular geographic area 132 based on the delivery locations (e.g., customer locations 130). For instance, the recommendation module 152 may identify physical addresses of the customer locations 130 at which the items were delivered by the couriers 122 and from the delivery restaurants 120. The recommendation module 152 may determine a group of customers 110 in the same geographic area (e.g., city, zip code, neighborhood, etc.) to identify a number of the tagged items purchased by each customer 110 in the group of the customers 110. The recommendation module 152 can then determine, based on the number of the tagged items, "adventurous" or "diversity" scores which indicate how diverse the customers 110 in the geographic area 132 are with respect to item consumption. The diversity scores may be based on number of tagged items that have been ordered by the customers 110, as \yell as the diversity or differences between the tagged items. For example, a customer 110 that has only ordered items 148 from two different tags 150 or groups (e.g., Pizza tag and Hamburger tag) may have a lower diversity score than a customer 110 that has ordered items 148 from four different tags 150 or groups e.g., Italian tag, Hamburger tag, Mexican Tag, and Pizza tag). Additionally, a customer 110 that has ordered items that belong to tags that are much different by having vectors that are further apart in the vector space model 146 (e.g., Steak tag versus Vegetarian tag) may have a higher diversity score than a customer 110 that orders items 148 that belong to tags 150 having vectors that are closer together in the vector space model 146 (e.g., Calzone tag versus Pizza tag).

Once the recommendation module 152 has calculated the diversity scores for each customer 110 in a geographic area 132, the recommendation module 152 may determine an aggregate diversity score for the geographic area 132 that indicates how adventurous or diverse the customers 110 in that geographic area 132 are as a group. If the geographic area 132 has a higher aggregate diversity score, the recommendation module 152 may provide a recommendation 154 to a merchant device 114 that the corresponding merchant 108 establish a restaurant (e.g., dine-in restaurant, mobile restaurant 118, etc.) and/or begin performing deliveries (e.g., deliver restaurant 120) in the geographic area 132. Conversely, if the geographic area 132 has a lower aggregate diversity score, the recommendation module 152 may refrain from recommending the geographic area 132 as a favorable location for a restaurant. Generally, any of the recommendations and/or other communications described herein may be provided using one or more methods or means. For instances, the recommendations and/or other communications may be provided and/or surfaced using the delivery application 126, text messages, emails, push notifications, and/or other means for communicating. The recommendations and/or other communications may be provided to the customers devices 124, the merchant devices 114, and/or other user devices.

In some examples, if a geographic area 132 has a lower diversity score, the recommendation module 152 may identify particular cuisine types that are primarily consumed by customers 110 in the geographic area 132. If there are one, or a few, cuisine types that are primarily consumed by the customers 110, the recommendation module 152 may identify merchants 108 that provide menu items 148 from those particular cuisine types, and provide recommendations 154 to those merchants 108 to establish restaurants in the particular geographic area 132.

The recommendation module 152 may perform additional, or alternative operations, using the tagged menu items 148. For example, the recommendation module 152 may determine that a merchant 108 operates a delivery restaurant 120 with items 148 that primarily belong to a particular tag 150, such as a particular cuisine type. Using the tagged menu items and transaction histories for customers 110, the recommendation module 152 may determine that the merchant 108 does not offer a popular menu item 148 from the particular tag 150 or cuisine type offered by other restaurants, and send a recommendation 154 to the merchant 108 indicating that the merchant 108 include the popular menu item 148 in their menu. Additionally, the recommendation module 152 may analyze menus of restaurants that do offer the popular menu item 148 to determine an average price of the menu item using the menu data 140 and recommend a price for the popular menu item 148 if the merchant 108 chooses to add the item 148 to their menu. As another example, the recommendation module 152 may more intelligently group restaurants and/or menus in their application for customers 110 to browse, and also more intelligently recommend items 148 to customers 110. For instance, if a particular customer 110 commonly orders items 148 using their delivery application 126 that belong to a particular tag 150 or cuisine type, such as Pizza, the recommendation module 152 may use to vector space model 146 to identify vectors that are close in space to the particular tag 150 and surface recommendations 154 to that customer 110 for other, similar cuisine types, such as Calzones. For instance, the customer 110 may be browsing their delivery application 126, and recommendations for similar tags 150, such as cuisine types, to what the customer 110 typically ordered may be surfaced or otherwise presented more prominently in the delivery application 126 for the customer 110.

In some examples, the payment-processing system 102 may include stationary devices, including but not limited to servers, desktop computers, personal computers, work stations, and thin clients, such as those capable of operating in a distributed computing resource. In some examples, the computing device(s) of the payment-processing system 102 may include mobile devices, including but not limited to mobile phones, tablet computers, laptop computers, and any other mobile computers or mobile telecommunication devices. In various examples, computing device(s) of the payment-processing system 102 may include any other sort of computing device configured to communicate via the one or more networks 112.

In various examples, network(s) 112 may include public networks such as the internet, private networks such as an institutional and/or personal network or some combination of public and private networks. Network(s) 112 may also include any type of wired and/or wireless network, including but not limited to local area networks (LAN), wide area networks (WAN), satellite networks, cable networks, Wi-Fi networks, WiMax networks, mobile communications networks (e.g., 3G, 4G, etc.), or any combination thereof. Network(s) 112 may utilize communications protocols, including packet-based and/or datagram-based protocols, such as internet protocol (IP), transmission control protocol (TCP), user datagram protocol (UDP), or other types of protocols. Moreover, network(s) 112 may also include a number of devices that facilitate network communications and/or form a hardware basis for the networks, such as switches, routers, gateway access points, firewalls, base stations, repeaters, backbone devices, and the like.

In some examples, network(s) 112 may further include devices that may enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

Figure 2A:
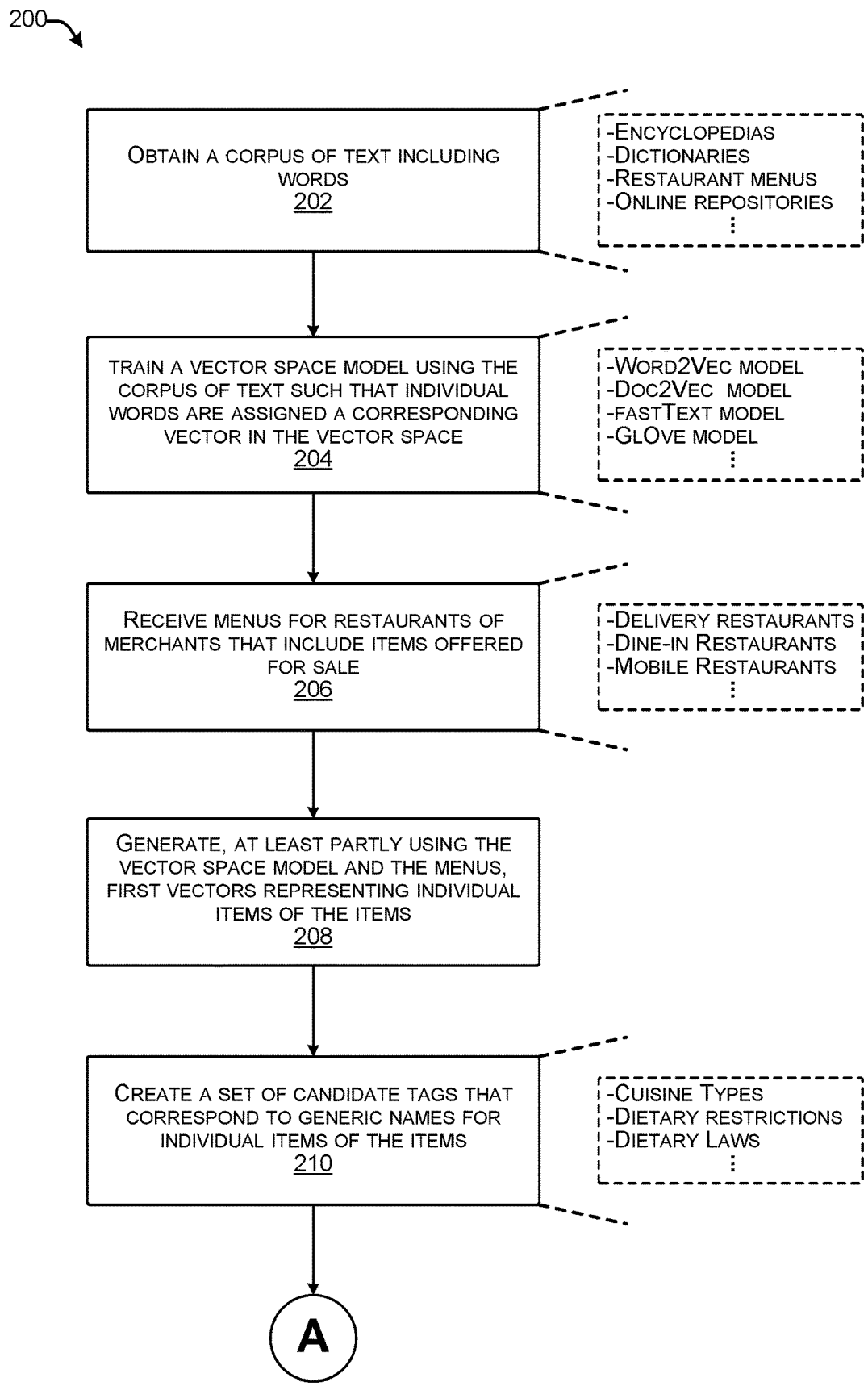
FIGS. 2A and 2B illustrate an example process for generating a vector space model to convert menu items and tags into vectors for numerical comparison as described herein.
Figure 2B:
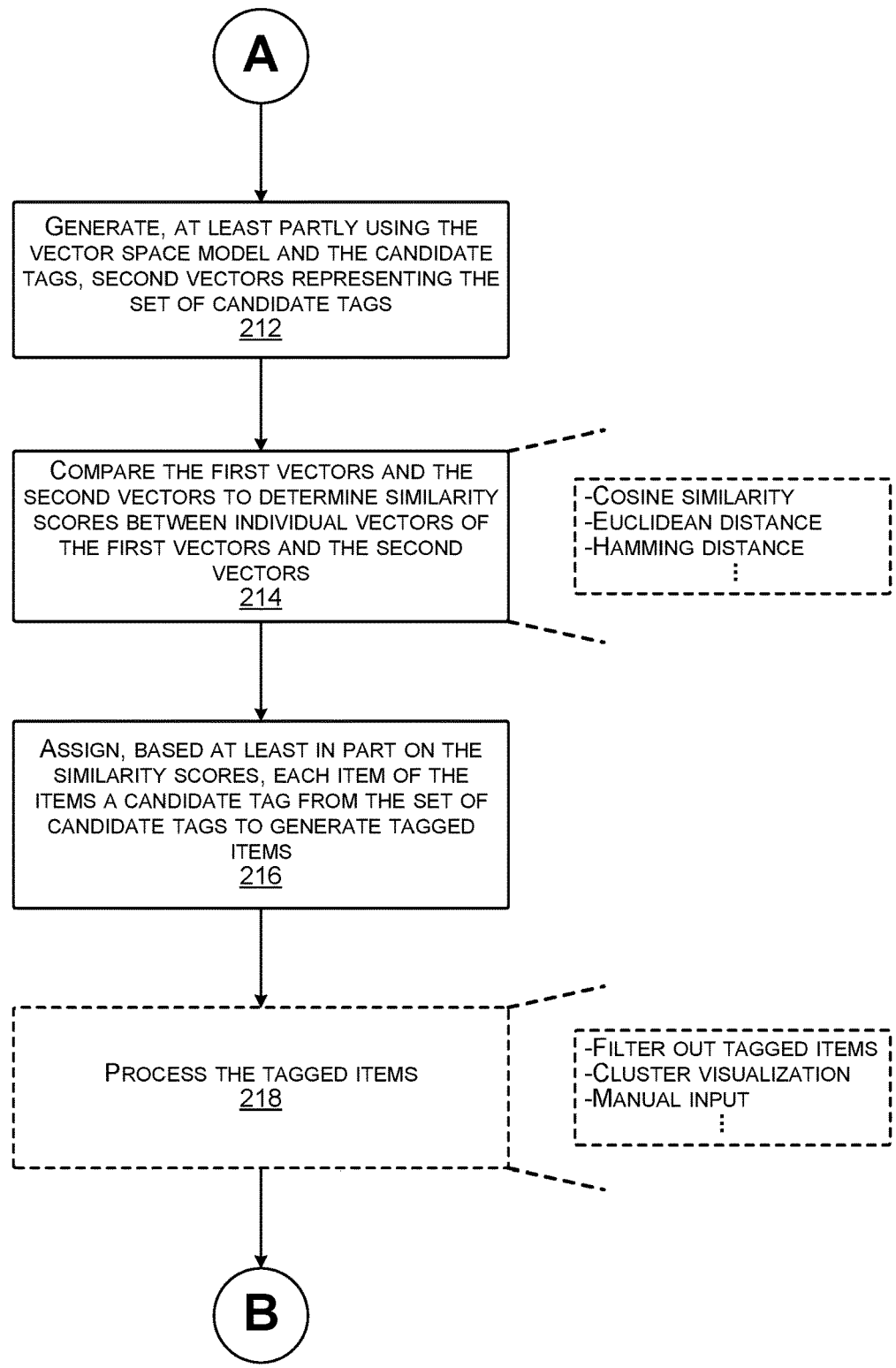

FIGS. 2A and 2B illustrate a flow diagram illustrating an example process 200 according to some implementations. The process of FIGS. 2A and 2B is illustrated as a collection of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 2A and 2B can be combined with some or all of the operations illustrated in others of FIGS. 2A and 2B. For discussion purposes, the processes are described with reference to the environments, architectures and devices described in FIG. 1 above, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

FIGS. 2A and 2B illustrate an example process for generating a vector space model 146 to convert menu items 148 and tags 150 into vectors for numerical comparison.

Block 202 illustrates obtaining, at a computing device of a food-ordering service 106, a corpus of text including words. The corpus of words may be obtained from one or more text data sources. For example, the corps of words may be obtained from digital encyclopedias (e.g., Wikipedia) and/or digital dictionaries. In some examples, the corpus of words may simply comprise restaurant menus (e.g., menu data 140) received from restaurants of merchants 108 that utilize the food-ordering service 106. The corpus of text may additionally, or alternatively, be obtained from online repositories of text representing words. In some instances, the corpus of text may include general words, while in other examples, the corpus of text may include words related to menu items, cooking, restaurants, and so forth.

Block 204 illustrates training, by an item-analysis module 134, a vector space model 146 using the corpus of text such that individual words are assigned a corresponding vector in the vector space 146. The training may be performed using one or more machine-learning algorithms or models, such as Word2Vec model(s), Doc2Vec model(s), fastText model(s), and/or GlOve model(s). For instance, the item-analysis module 134 may train the vector space model 146 using Word2Vec, which is a neural network word embedding technique that learns the vector space model 146 from the corpus of text such that related words are closer in the space than non-related words. In this way, operations such as similarity comparisons and vector algebra may be performed on concepts represented in words.

Generally, Word2Vec may infer or determine the meaning of a word by the neighboring words. For example, if the words "Pie" and "Pizza" in the menu data 140 are commonly found around the same words, such as "Hawaiian," "Pepperoni," "Sausage," and so on, Word2Vec may place vectors for "Pie" and "Pizza" near each other in the vector space model 146. In this way, Word2Vec (and other machine-learning models discussed herein) can surface similar concepts, find unrelated concepts, and compute similarities between multiple words using mathematical representations (e.g., numeric vectors) to represent words in a vector space.

In some examples, Word2Vec may comprise a two-layer neural net that processes the corpus of text including words as an input, and outputs a set of vectors, such as feature vectors for words in the corpus. Thus, the vector space model 146 may be utilized to convert individual words into vectors. According to the techniques described herein, Doc2Vec (or other techniques) may be utilized for multi-word phrases. Word2Vec may be utilized to group the vectors of similar words in the vector space model 146, and detect similarities between the words mathematically. Accordingly, the techniques described herein allow for words to be represented such that mathematical algorithms may be utilized to find conceptually similar words. Word2Vec and other models can make accurate determinations about the menu items 148 and the tags 150 and how they are conceptually related to each other. The closer a word is conceptually to another word, the closer their corresponding vectors will be in space in the vector space model 146. For example, the word "sandwich" will be closer in the vector space model 146 to "hamburger" than to "ramen."

In some examples, Doc2Vec or other ML algorithms may be utilized to generate vectors to convert a multi-word items 148 and/or tags 150. However, in some examples Word2Vec may be utilized on the individual words in a multi-word tag 150 or menu item 148 (e.g., the tag "Indian Curry" and the menu item "Big Bob's Chile Sombrero Burger"). In examples where Word2Vec is used for a multi-word tag 150 or menu item 148, the vectors created for each word in the multi-word item 148 or tag 150 may be averaged together. For example, a vector for the menu item 148 "Indian Curry" may be determined by creating a vector for the word "Indian," a vector for the word "Curry," and averaging the vectors together to form a single vector for "Indian Curry."

Block 206 illustrates the payment-processing system 102 receiving menus (e.g., menu data 140) for restaurants (e.g., mobile restaurants 118, dine-in restaurants 116, and/or delivery restaurants 120) of merchants 108 that include items offered for sale. In some examples, the menus may be received from merchants 108 who would like to utilize the food-ordering service 106 such that their restaurants may be delivery restaurants 120 that have items delivered by couriers 122 based on orders from the delivery applications 126.

Block 208 illustrates an item-analysis module 144 generating, at least partly using the vector space model 146 and the menus 140, first vectors representing individual items 148 of the items 148. For example, the vector space model 146 may include one or more related models, such as two-layer neural networks that are trained to reconstruct linguistic contexts of words, that produce word embeddings. The vector space model 146 may be trained to receive the words that represent items in the menu data 140 (e.g., menu items 148), and output first vectors that comprise numeric representations of the menu items 148. In some examples, the word vectors may be positioned in a vector space such that menu items 148 that share common contexts in the menu data 140 are located in close proximity to one another in the vector space.

Block 210 illustrates the item-analysis module 144 creating a set of candidate tags 150 that correspond to generic names for individual items of the items 148. In some examples, the item-analysis module 144 may identify the tags 150 from various online sources, and/or receive input from an operator of the payment-processing system 102 that identifies the tags 150. The tags 150 may correspond to cuisine types (e.g., "Pizza", "Burger", and "Thai curry"), dietary restriction (e.g., "Vegetarian", "Vegan"," and "Gluten Free"), and/or dietary laws (e.g., "Kosher"). In some instances, the tags 150 may further comprise individual multi-word tags 150 that capture a broader concept (e.g., "Cake Cookies Pie") and match menu items 148 beyond just those listed in the tag 150 (e.g., match cupcake and donut items for "Cake Cookies Pie"). Generally, the tags 150 may be created based on where most of the menu items 148 are to be classified by only one of the tags 150 in the set of candidate tags 150.

Block 212 illustrates the item-analysis module 144 generating, at least partly using the vector space model 146 and the candidate tags 150, second vectors representing the set of candidate tags 150. For instance, the list of tags 150 may be input into the vector space model 146, and the vector space model 146 may output second vectors that comprise numeric representations of the candidate tags 150 such that tags 150 which are conceptually more similar are located more closely in a resulting vector space of the second vectors representing the tags 150.

Block 214 illustrates the item-analysis module 144 comparing the first vectors and the second vectors to determine similarity scores between individual vectors of the first vectors and the second vectors. For example, the first vectors and the second vectors may be compared using various algebraic methods, such as cosine similarity, Euclidian distance, and/or any other usable formula, to determine how similar individual ones of the first vectors are to individual ones of the second vectors. In the cosine similarity example, two vectors with no similarity may be expressed as a 90-degree angle (e.g., "0"), while total similarity between vectors (e.g., "1") is a 0-degree angle, meaning the vectors completely overlap. Thus, the similarity scores between the first vectors and second vectors determined using cosine similarity such that similarity scores that are nearer "1" indicate that the vectors are dissimilar, and thus the corresponding words are dissimilar, but that similarity scores that are nearer "0" indicate that the vectors are similar and are close to overlapping, and thus the corresponding words are conceptually similar. In some examples, each of the first vectors may be compared to each of the second vectors to determine similarity scores, such as by using cosine similarity.

Block 216 illustrates the item-analysis module 144 assigning, based at least in part on the similarity scores, each item 1148 of the items 148 a candidate tag 150 from the set of candidate tags 150 to generate tagged items. In some examples, the item-analysis module 144 may determine, for each menu item 148, the tag 150 that has the highest similarity score and assign that tag 150 to the menu item 148. The item-analysis module 144 may assign the items 148 to a tag 150 using any technique, such as grouping the items 148 in a list under the appropriate tag 150, assigning metadata to the menu items 148 in memory to indicate the tag 150, and/or any other technique to identify a menu item 148 as belonging to a specific tag 150.

Block 218 is in a dashed line to indicate it is optional (e.g., need not necessarily be performed), and illustrates the item-analysis module 144 processing the tagged items. For example, the item-analysis module 144 may simply filter out menu items 148 whose most similar candidate tag 150 is below a minimum threshold (e.g., 0.5, 0.3, etc.). In some examples, the item-analysis module 144 may further validate the classification results via cluster visualization. For instance, as described more in FIG. 3A, the item-analysis module 144 may cluster the first vectors and second vectors into cluster valuations such that an operator of the food-ordering service 106 may visualize the clusters and/or any outliers. Additionally, the operator may be able to provide manual input to change a menu item 148 from one tag 150 to another tag 150 based on the cluster visualization, and/or make other changes or provide other input.

Figure 3A:
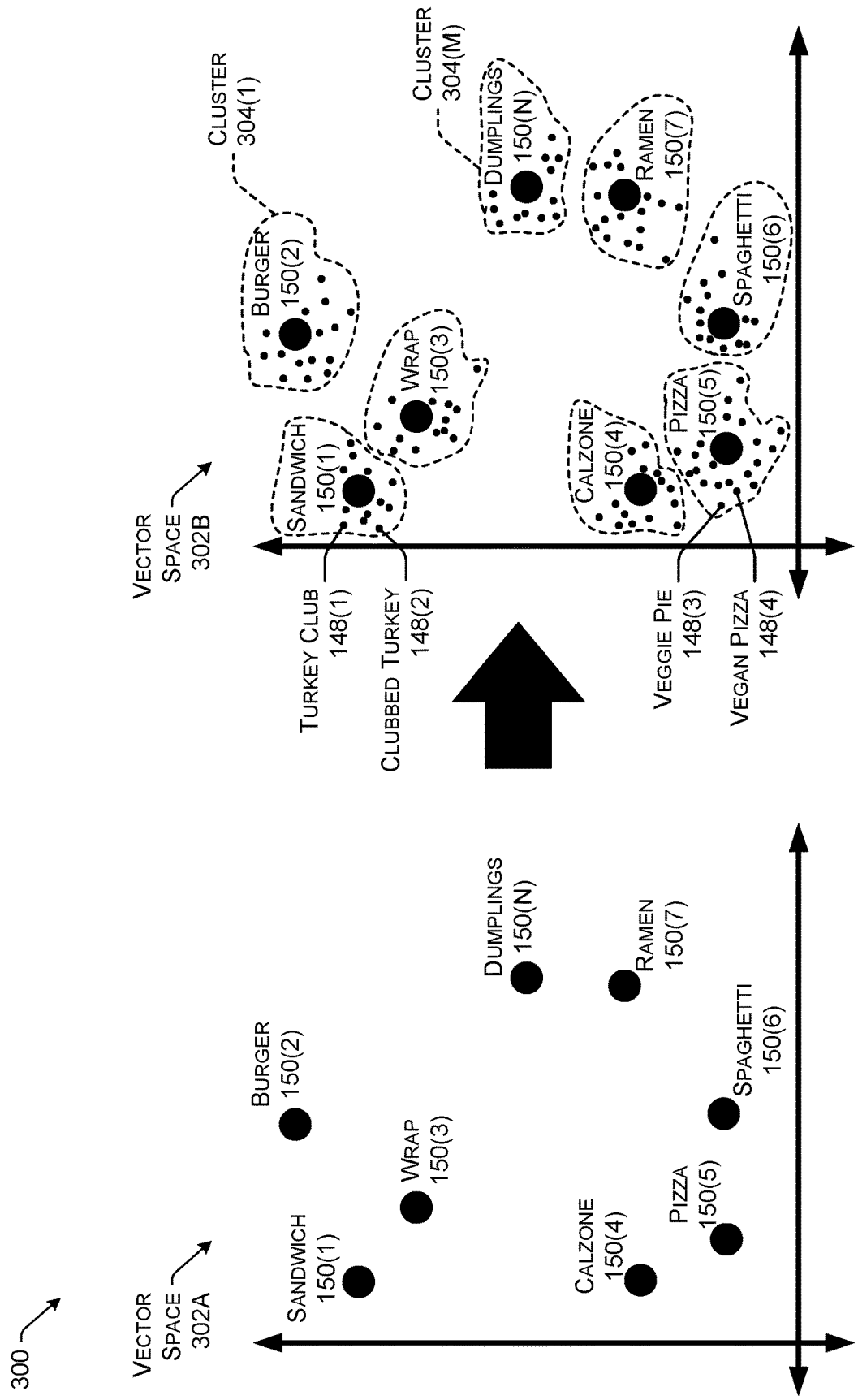
FIG. 3A illustrates an example diagram of clustering menu items into clusters corresponding to tags in a vector space as described herein.

FIG. 3A illustrates an example diagram 300 of a vector space 302 in which menu items 148 are clustered into clusters 304 corresponding to tags 150 in the vector space 302 as described herein. Vector space 302A illustrates a vector space trained with a corpus of text and representing tags 150 in the vector space 302A such that tags 150 are positioned closer to tags 150 that are more conceptually similar. As shown in the illustration of the example vector space 302A, tags for sandwich 150(1), burger 150(2), and wrap 150(3) are positioned near each other in space as they are conceptually similar to each other. Similarly, spaghetti 150(5) is illustrated as being near pizza 150(5) in that they are both generally use a tomato-based sauce, but spaghetti 150(6) is also near ramen 150(7) because they both include noodles.

The vector space 302B illustrates vectors for the menu items 148 being clustered into clusters 304 based on the tags 150 to which the menu items 148 are "closest" to in the vector space 302B. As shown, the vectors for the menu items of turkey club 148(1) and clubbed turkey 148(2) are positioned near each other in the vector space 302B, and also included in the cluster 304 for sandwich 150(1). As another example, the vectors for the menu items of veggie pie 148(3) and vegan pizza 148(4) are positioned near each other in the vector space 302B, and also are included in the cluster 304 for the pizza tag 150(5). In this way, the vector space 302 may be visualized using clusters 304 of menu items 148 to illustrate which tags 150 the menu items 148 belong.

Figure 3B:
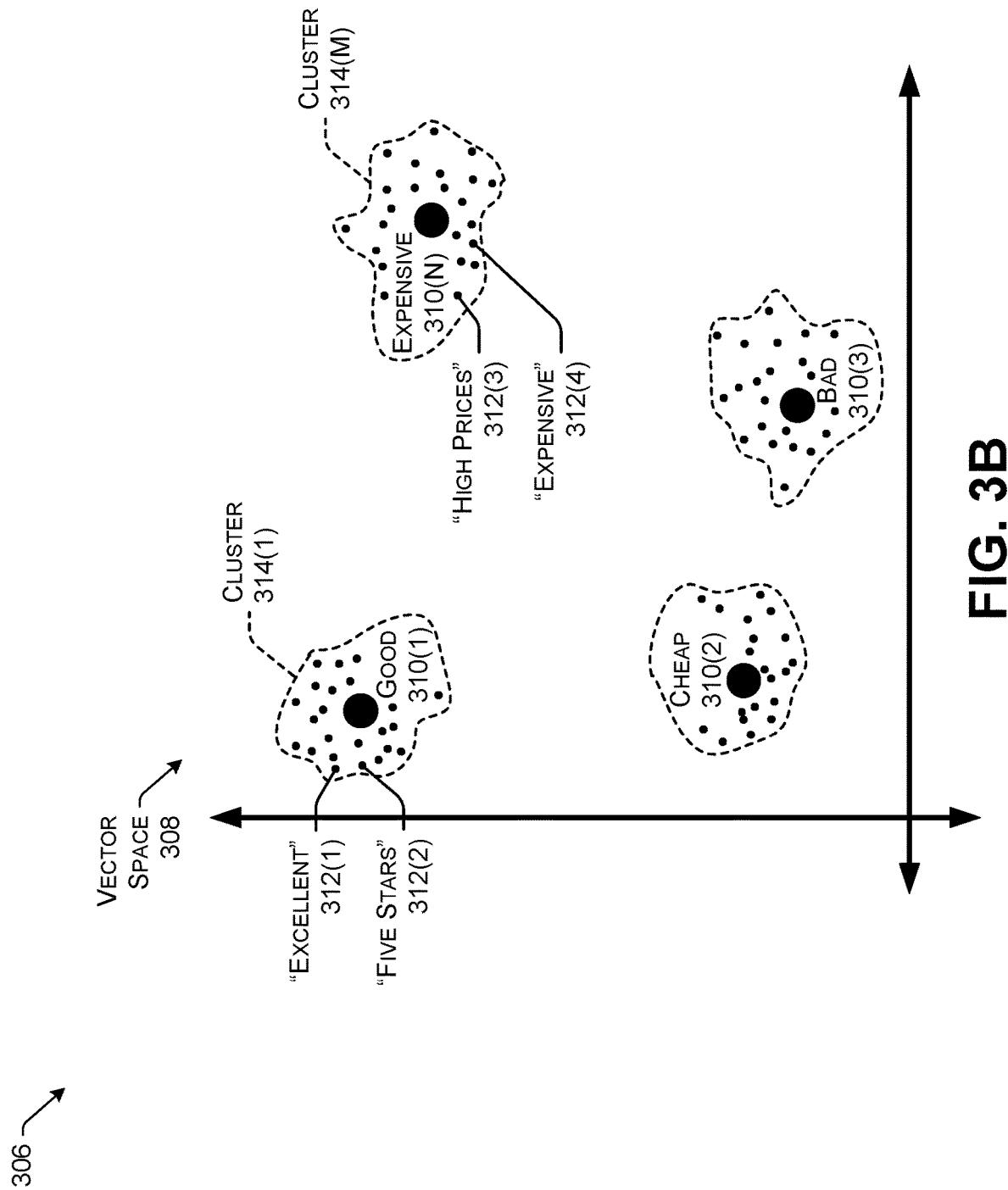
FIG. 3B illustrates an example diagram of clustering feedback into clusters corresponding to feedback categories in a vector space as described herein.

FIG. 3B illustrates an example diagram 306 of clustering feedback into cluster corresponding to feedback categories in a vector space as described herein.

In some examples, the delivery application 126 may provide a feedback option through which the customers 110 can provide feedback. The feedback data may include various data, such as the typical one star through five stars, as well as text-based feedback data. For example, customers 110 may be allowed to type in text-based feedback data indicating their experience ordering items 148 from delivery restaurants 120 using the delivery application 126.

The food-ordering service 106 may create a vector space 308 that includes vectors that represent one or more feedback categories 310 for clustering customer feedback, such as Good 310(1), Cheap 310(2), Bad 310(3), and/or Expensive 310(N). In some examples, the feedback categories 310 may be used similar to the tags 150 in that they represent high-level categories of customer feedback. Thus, the food-ordering service 106 may trained the vector space 308 using a corpus of text such that feedback categories 310 are positioned close to other feedback categories 310 that are conceptually similar, and further from feedback categories 310 that are conceptually dissimilar. Further, the vector space 308 may include vectors for customer feedback 312 that are located in the vector space 308 closer to feedback categories 310 to which the customer feedback 312 is conceptually similar. For example, customer feedback 312 such as "Excellent" and "Five Stars" may be located near the feedback category 310(1) for good feedback. As another example, customer feedback 312 such as "high prices" and "expensive" may be located in the vector space 308 closer to feedback category 310 for expensive.

The vector space 308 illustrates vectors for the customer feedback 312 being clustered into clusters 314 based on the feedback categories 310 to which the customer feedback 312 is "closest" to in the vector space 308. In this way, the clusters 314 may provide visualizations of customer feedback 312 that belong to specific feedback categories 310. Additional detail regarding the method of creating and/or generating the vector space 308 using feedback data.

FIGS. 4-8 are flow diagrams illustrating example processes according to some implementations. The processes of FIGS. 4-8 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 4-8 can be combined with some or all of the operations illustrated in others of FIGS. 4-8. For discussion purposes, the processes are described with reference to the environments, architectures and devices described in FIG. 1 above, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 4:
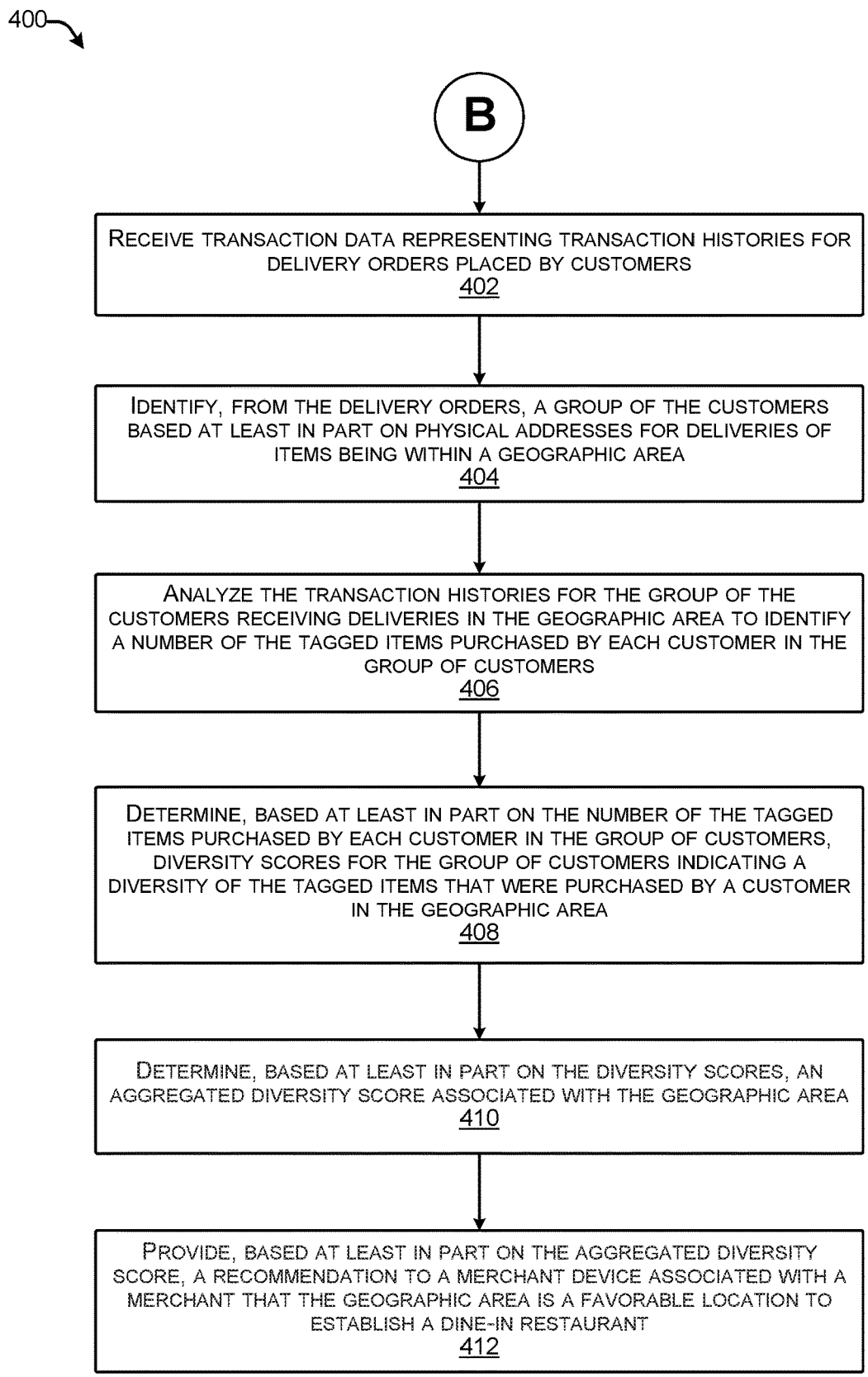
FIG. 4 illustrates an example process for utilizing a vector space to analyze menu items for delivery restaurants in order to determine optimized geographic locations for merchants to establish restaurants as described herein.

FIG. 4 illustrates an example process 400 for utilizing a vector space to analyze menu items 148 for delivery restaurants 120 in order to determine optimized geographic locations/areas 132 for merchants 108 to establish restaurants as described herein. In some examples, the steps or operations of process 400 may begin after steps of process 200, such as step 216 and/or 218.

Block 402 illustrates receiving, at a payment-processing system 102, transaction data 128 representing histories for delivery orders placed by customers 110. In some examples, the transaction data 128 may be generated at or by the merchant devices 114 for the delivery orders. In various examples, the transaction-processing module 104 may process the order data 142 and generate the transaction data 128 for the food-ordering service 106. Additionally, or alternatively, the transaction data 128 may be received directly from the customer devices 124, and through the delivery application 126, at the payment-processing system 102.

Block 404 illustrates identifying, from the delivery orders, a group of the customers 110 based at least in part on physical addresses for deliveries of items being within a geographic area. For instance, the food-ordering service 106 may identify, based on the order data 142 used for deliveries by the couriers 122, physical addresses (e.g., city, zip code, street addresses, etc.) for customers are being with a same geographic area 132. For instance, the may identify a group of customers 110 located in a same city, zip code, neighborhood, and/or street. In some examples, the location may be determined in other ways. For example, the food-ordering service 106 may identify locations of the customers 110 using IP addresses of the customer devices 124, locations indicated by the order data 142, locations indicated by delivery data, and/or by any other means.

Block 406 illustrates analyzing the transaction histories for the group of the customers 110 receiving the deliveries in the geographic area 132 to identify a number of the tagged items purchased by each customer 110 in the group of customers 110. In some examples, the food-ordering service 106 may determine, based on the tagged items, how many items from different tags 150 each customer 110 purchased. Additionally, the food-ordering service 106 may determine how many items 148 in each of the different tags 150 each customer 110 bought. Even further, the food-ordering service 106 may determine how "far apart" the different tags 150 are for the menu items 148 purchased by each customer 110.

Block 408 illustrates determining, based at least in part on the number of tagged items purchased by each customer 110 in the group of customers 110, diversity scores for the group of customers 110 indicating a diversity of the tagged items that were purchased by a customer 110 in the geographic area 132. In some examples, the food-ordering service 106 can determine, based on the number of the tagged items, "adventurous" or "diversity" scores which indicate how diverse the customers 110 in the geographic area 132 with respect to item consumption. The diversity scores may be based on a number of tagged items that have been ordered by the customers 110, as well as the diversity or differences between the tagged items. For example, a customer 110 that has only ordered items 148 from two different tags 150 or groups (e.g., Pizza tag and Hamburger tag) may have a lower diversity score than a customer 110 that has ordered items from four different tags or groups (e.g., Italian tag, Hamburger tag, Mexican Tag, and Pizza tag). Additionally, a customer 110 that has ordered items 148 that belong to tags 150 that are much different by having vectors that are further apart in the vector space model 146 (e.g., Steak tag versus Vegetarian tag) may have a higher diversity score than a customer 110 that orders items 148 that belong to tags 150 having vectors that are closer together in the vector space model 146 (e.g., Calzone tag versus Pizza tag). The diversity scores may be based on any numbering or scoring scale.

Block 410 illustrates determining, based at least in part on the diversity scores, an aggregated diversity score associated with the geographic area 132. For instance, the food-ordering service 106 may simply average out, or otherwise combine, the diversity scores for each customer 110 in the geographic area 132 to determine how diverse or adventurous the group of customers 110 in geographic area 132 are as a group. In some examples, the diversity scores may be relatively low for a geographic region, which indicates that the customers 110 primary consume menu items 148 from one, or a few, cuisine types. In such examples, the aggregated diversity score associated with the geographic area 132 may be relatively low, indicating one or a few primarily consumed cuisine types.

Block 412 illustrates providing, based at least in part on the aggregated diversity score, a recommendation 154 to a merchant device 114 associated with a merchant 108 that the geographic area 132 is a favorable location to establish a dine-in restaurant 116. For example, the food-ordering service 106 may determine that the aggregated diversity score is a high score, or over a threshold score, that indicates the customers 110 in the geographic area 132 are adventurous, diverse, and/or enjoy items 148 that belong to different cuisines or dietary lifestyles. This may indicate that the customers 110 would be receptive to a new dine-in restaurant 116, and would enjoy trying it out. In examples where the diversity scores are low, the recommendation 154 may be provided to a merchant device 114 associated with a merchant that provides menu items 148 that are from the primarily consumed cuisine types in the geographic area 132 with the low diversity scores. As a specific example, a geographic area 132 with a relatively low aggregated diversity score may have customers 110 that order menu items 148 from one or two cuisine types, such as pizza in an area 132 near a college campus. Thus, the recommendation 154 may be provided to a merchant device 114 associated with a merchant 108 that operates pizza restaurants that the geographic area 132 is a favorable location to establish a dine-in restaurant 116.

In some examples, the food-ordering service 106 may identify (e.g., using the restaurant profiles 138) a merchant 108 as operating mobile restaurant(s) 118, such as a food truck, that has a menu (e.g., menu data 140) Which includes at least one item 148 that corresponds to a tagged item. The food-ordering service 106 may determine, based at least in part on the transaction data 140, at least one of a popular time of day or a popular day of a week at which to sell the at least one tagged item in the geographic area 132. For instance, the mobile restaurant 118 may be a taco truck, and the customers 110 may have transaction data 128 indicating that they frequent "Taco Tuesday" for lunch or dinner. In such examples, providing the recommendation 154 may include recommending that the merchant 108 schedule to establish their mobile restaurant 118 in the geographic area 132 according to the at least one of the popular time of the day or the popular day of the week.

In further examples, the food-ordering service 106 may recommend that a merchant 108 that operates a deliver restaurant 120 begin to provide deliveries to a geographic area 132. For instance, the delivery restaurant 120 may not provide deliveries to the geographic area 132 if it is further than a threshold distance away to save on courier 122 fees. However, if the geographic area 132 is particularly diverse, or enjoys the cuisine offered by the delivery restaurants 120, the food-ordering service 106 may send a recommendation 154 that the merchant 108 begin providing deliveries from their delivery restaurant 120 to the geographic area 132.

In some examples, generating the vector space comprising first vectors representing individual items of the items may include inputting the menus into a machine-learning (ML) model configured to perform a word embedding technique such that the first vectors comprise first numerical representations of the items. Further, in such examples the generating the second vectors may include inputting the set of candidate tags into the ML model such that the second vectors comprise second numerical representations of the set of candidate tags. In such examples, comparing the first vectors with the second vectors to determine the similarity scores includes may comprise calculating cosine similarities between the first vectors and the second vectors.

FIG. 5 illustrates an example process 500 for utilizing a vector space to analyze menu items 148 to recommend a menu item 148 for a merchant 108 as described herein. In some examples, the steps or operations of process 500 may begin after steps of process 200, such as step 216 and/or 218

Block 502 illustrates identifying, based at least in part on the tagged items, a first menu of a first merchant 108 that includes first items 148 of a same cuisine type (e.g., tag 150) as second items included in a second menu of a second merchant 108. For instance, the food-ordering service 106 may determine that a merchant 108 has a menu with items that are in a same cuisine type as a menu of another merchant 108. As a specific example, both merchants 108 may sell Mexican food and have a menu that includes tacos and burritos.

Block 504 illustrates identifying at least one of the first items included in the first menu that is not included in the second menu. For example, the food-ordering service 106 may determine that the first menu of the first merchant 108 includes fajitas, but that the second menu offered by the second merchant 110 does not include fajitas.

Block 506 illustrates identifying, from the first menu, a price associated with the at least one of the first items. Stated otherwise, the food-ordering service 106 may determine that the price in the first menu for the fajitas is $12.00 for chicken fajitas.

Block 508 illustrates providing another recommendation 1543 to another merchant device 114 associated with the second merchant 108 to add the at least one of the first items 148 to the second menu and a suggested price for the at least one of the first items 148. For instance, the food-ordering service 106 may provide (e.g., email, text, etc.) a recommendation 154 to a merchant device 114 that the second merchant 108 should add fajitas to their menu, and a reasonable price would be $12.00.

In some examples, the food-ordering service 106 may further determine a popularity of the item 148 before providing the recommendation 154. For instance, the food-ordering service 106 may determine, based at least in part on transaction data 128 for the restaurant that has the fajitas, how popular the fajitas are from the other items 148 on the menu. The food-ordering service 106 may determine a popularity score, such as a ratio of how often the fajitas are purchased compared to other menu items 148. If the popularity score indicates that the fajitas are popular, or over a threshold popularity, the food-ordering service 106 made determine to provide the recommendation 154 to the second merchant 108 to add the fajitas to their menu.

Figure 6:
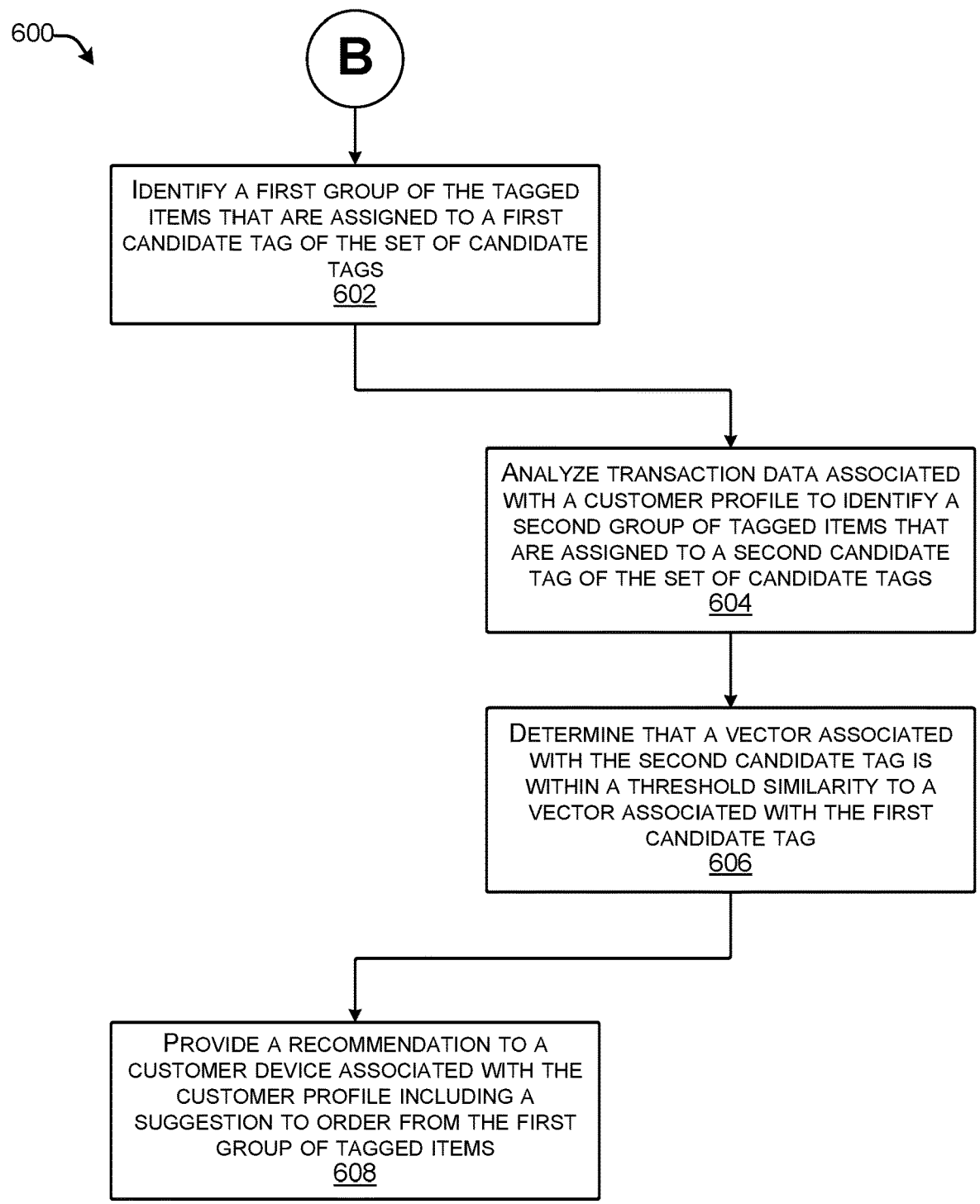
FIG. 6 illustrates an example process for utilizing a vector space to determine that a customer orders items from a particular cuisine type, and providing a grouping of items in another cuisine type that the customer may be interested in as described herein.

FIG. 6 illustrates an example process 600 for utilizing a vector space to determine that a customer 110 orders items 148 from a particular cuisine type (e.g., tag 150), and providing a grouping of items 148 in another cuisine type that the customer 110 may be interested in as described herein. In some examples, the steps or operations of process 600 may begin after steps of process 200, such as step 216 and/or 218

Block 602 illustrates identifying a first group of the tagged items that are assigned to a first candidate tag 150 of the set of candidate tags 150. As a specific example, the food-ordering service 106 may identify items 148 that are assigned to a tag for Pizza.

Block 604 illustrates analyzing transaction data 128 associated with a customer profile 136 to identify a second group of tagged items that are assigned to a second candidate tag 150 of the set of candidate tags 150. For instance, the food-ordering service 106 may identify, from a customer's profile 136, that the customer 110 commonly orders items 148 that are assigned to a tag 150 for Calzones.

Block 606 illustrates determining that a vector associated with the second candidate tag 150 is within a threshold similarity to a vector associated with the first candidate tag 150. For instance, the food-ordering service 106 may determine that the vector representing the tag 150 Pizza is close in a vector space to the tag 150 representing Calzone (e.g., within a threshold distance in the vector space indicating similar tags 150).

Block 608 illustrates providing a recommendation 154 to a customer device 124 associated with the customer profile 136 including a suggestion to order from the first group of tagged items 150. For instance, the food-ordering service 106 may surface a new category, or cuisine type (e.g., tag 150) in the delivery application 126 for the customer profile 136 indicating a suggestion that the customer 110 should order a Calzone. Because the customer 110 often orders Pizza, and because the vectors for the tags 150 for Pizza and Calzones are near each other in a vector space, it is likely that the customer 110 would also like items 148 that belong to the tag 150 for Calzones. Thus, the food-ordering service 106 may surface, or cause to be displayed, a cuisine grouping in the delivery application 126 for Calzones so the customer 110 has the suggestion to order a Calzone presented to him or her.

Figure 7:
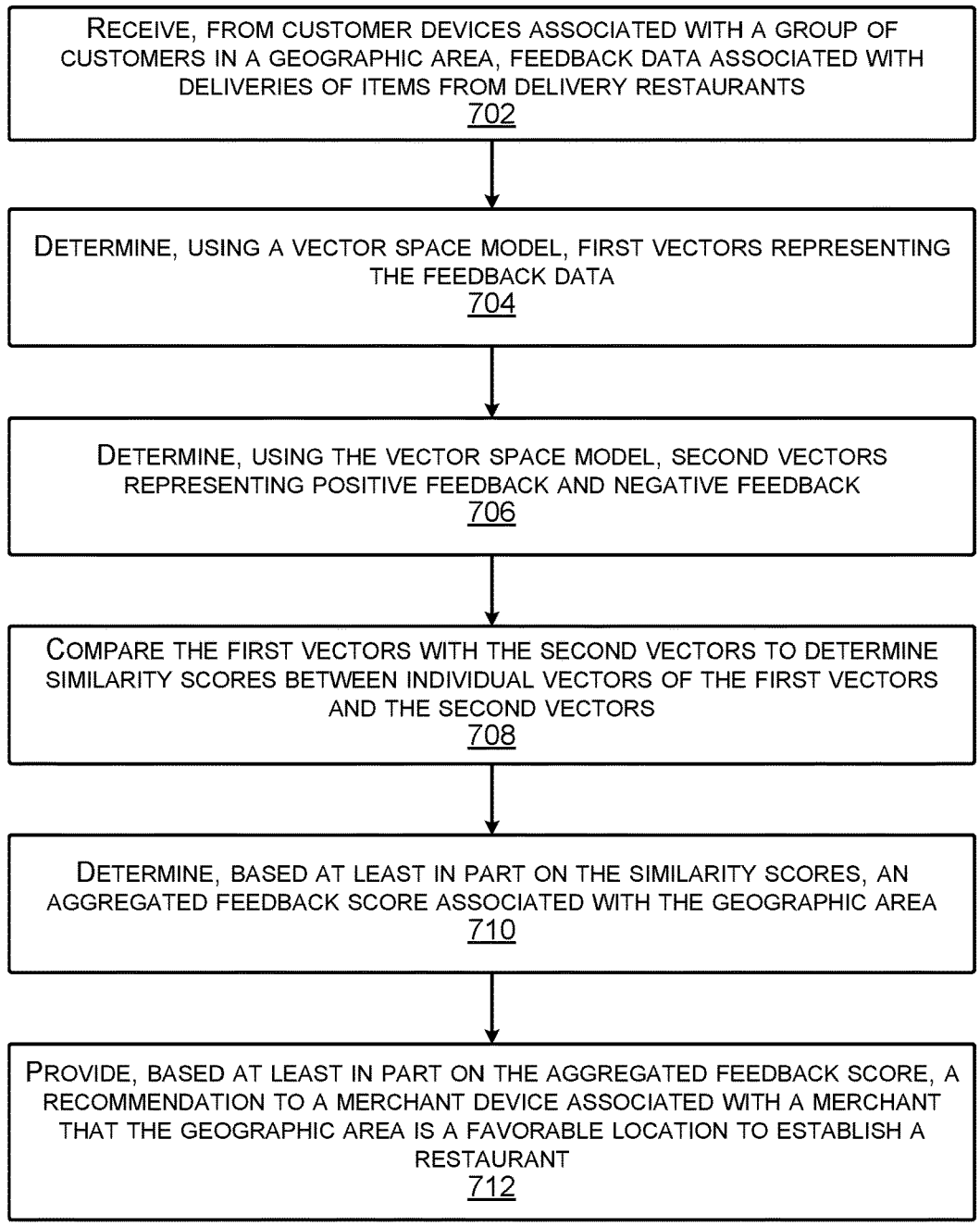
FIG. 7 illustrates an example process for generating a vector space model based on customer feedback to determine an optimized geographic location for a merchant to establish a restaurant as described herein.

FIG. 7 illustrates an example process 700 for generating a vector space model 146 based on customer feedback to determine an optimized geographic location 132 for a merchant 108 to establish a restaurant as described herein.

Block 702 illustrates receiving, from customer devices 124 associated with a group of customers 110 in a geographic area 132, feedback data associated with deliveries of items 138 from delivery restaurants. For instance, the delivery application 126 may provide a feedback option through which the customers 110 can provide feedback. The feedback data may include various data, such as the typical one star through five stars, as well as text-based feedback data. For example, customers 110 may be allowed to type in text-based feedback data indicating their experience ordering items 148 from delivery restaurants 120 using the delivery application 126.

Block 704 illustrates determining, using a vector space model 146, first vectors representing the feedback data. For instance, the food-ordering service 106 may utilize a vector space model 146 to generate first vectors representing feedback data. In some examples, the particular vector space model 146 may be trained using corpus data that includes words that may be utilized in feedback data.

Block 706 includes determining, using the vector space model 146, second vectors representing positive feedback and negative feedback. The positive feedback may include phrases such as "Great Restaurant", "Delicious Food", or the like. The negative feedback may include phrases such as "Terrible Restaurant", "Very Disappointed", or the like. The vector space model 146 may be trained to place vectors representing negative phrases larger distances away from phrases representing positive phrases. Neutral phrases such as "Service was acceptable" may be placed somewhere in the middle of the vector space model 146.

Block 708 illustrates comparing the first vectors with the second vectors to determine similarity scores between individual vectors of the first vectors and the second vectors. For instance, the food-ordering service 106 may determine the similarity scores using cosine similarity.

Block 710 illustrates determining, based at least in part on the similarity scores, an aggregated feedback score associated with the geographic area 132. For instance, the food-ordering service 106 may average the feedback scores for each of the vectors. The average may end up being closer to positive feedback, closer to negative feedback, or neural feedback.

Block 712 illustrates providing, based at least in part on the aggregated feedback score, a recommendation 154 to a merchant device 114 associated with a merchant 108 that the geographic area 132 is a favorable location to establish a restaurant. For instance, if the aggregated feedback score indicates that the customers 110 generally provide positive feedback, it may be a good place for a restaurant to be established, or to start delivering items.

In some examples, the feedback data may be utilized for other recommendations. For example, the feedback data and/or feedback scores may be utilized to identify particular menu items 148 that customers 110 gave positive feedback, and negative feedback. In this way, the food-ordering service 106 may recommend that merchants 108 being to provide menu items 148 on their menus that receive positive feedback, and potentially remove menu items 148 from their menu that receive negative feedback. Additionally, the feedback data may be utilized to recommend menu items 148 to customers 110 on their delivery applications 126. For example, the delivery applications 126 may surface, display, or recommend menu items 148 that receive positive feedback from other customers 110, and/or remove, hide, or conceal menu items 148 that receive negative feedback.

Figure 8:
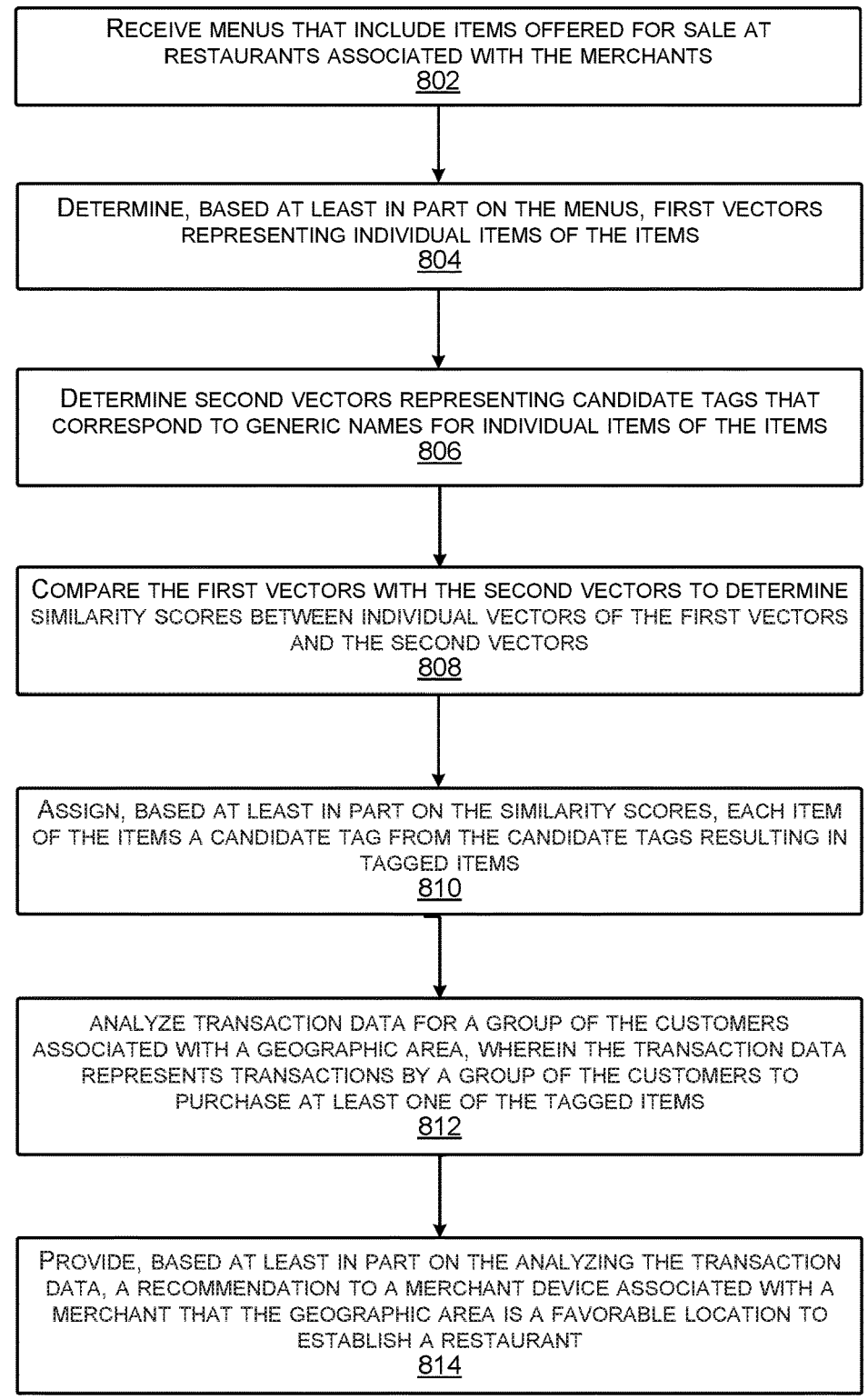
FIG. 8 illustrates an example process for utilizing a vector space model to analyze menu items for delivery restaurants in order to determine optimized geographic locations for merchants to establish restaurants as described herein.

FIG. 8 illustrates an example process 800 for utilizing a vector space model 146 to analyze menu items 148 for delivery restaurants 120 in order to determine optimized geographic locations 132 for merchants 108 to establish restaurants as described herein.

Block 802 illustrates receiving menus (e.g., menu data 140), at a payment-processing system 102, that include items 148 offered for sale at restaurants associated with the merchants 108. For instance, the payment-processing system 102 may receive menu data 140 from merchants 108 who wish to have their menus for their delivery restaurants 120 included in the delivery application 126.

Block 804 illustrates determining, by the item-analysis module 144 and based at least in part on the menus, first vectors representing individual items 148 of the items 148. For instance, the item-analysis module 144 may utilize the vector space model 146 to determine (or generate) first vectors representing items 148 from menus.

Block 806 illustrates determining second vectors representing candidate tags 150 that correspond to generic names (e.g., cuisine types, dietary restrictions, etc.) for individual items 148 of the items 148. For instance, the item-analysis module 144 may utilize the vector space model 146 to determine (or generate) second vectors representing tags 150.

Block 808 illustrates comparing the first vectors with the second vectors to determine similarity scores between individual vectors of the first vectors and the second vectors. For instance, the item-analysis module 144 may utilize cosine similarity to determine the similarity scores between the first vectors and the second vectors.

Block 810 illustrates assigning, based at least in part on the similarity scores, each item 148 of the items 148 a candidate tag 150 from the candidate tags 150 resulting in tagged items. For instance, the items 148 may be assigned to a candidate tag 150 that has the highest similarity score from amongst the tags 150.

Block 812 illustrates analyzing transaction data 128 for a group of the customers 110 associated with a geographic area 132. In some examples, the transaction data 140 represents transactions by a group of the customers 110 to purchase at least one of the tagged items. For instance, the transaction data 128 may be based on order data 142 for orders placed by customers 110 using a delivery application 126 on their customer devices 124.

In some instances, the restaurants may be delivery restaurants 120 that offer delivery of the items 148 to the customers 110 using couriers 122. In such examples, the food-ordering service 106 may identify the group of customers 110 based at least in part on physical addresses for deliveries of the items for the group of customers 110 being within the geographic area 132.

Block 814 illustrates providing, based at least in part on the analyzing the transaction data 128, a recommendation 154 to a merchant device 114 associated with a merchant 108 that the geographic area 132 is a favorable location to establish a restaurant.

In various examples, the food-ordering service 106 may identify the merchant 108 as operating a mobile restaurant 118 having a menu that includes at least one item 148 that corresponds to at least one tagged item. Further, the food-ordering service 106 may determine, based at least in part on the transaction data 128, at least one of a popular time of day or a popular day of a week at which to sell the at least one tagged item in the geographic area 132. In such examples, the providing the recommendation 154 includes recommending that the merchant 108 schedule to establish their mobile restaurant 118 in the geographic area 132 according to the at least one of the popular time of the day or the popular day of the week.

In some instances, the generic names (e.g., tags 150) of the items 148 correspond to at least one of cuisine types or dietary-restriction types, and the menus are for deliver restaurants 120. In such examples, the food-ordering service 106 may analyze menus for dine-in restaurants 116 that are located within the geographic area 132 or within a threshold distance to the geographic area 132. The food-ordering service 106 may determine, based at least in part on the menus, that less than a threshold of the dine-in restaurants 116 provide items 148 corresponding to at least one of a particular cuisine type or a particular dietary-restriction type. Further, the food-ordering service 106 may determine that the merchant 108 to which the recommendation 154 is provided is associated with a menu that includes items 148 that correspond to the at least one of the particular cuisine type or the particular dietary-restriction type.

In various examples, the food-ordering service 106 may cluster the tagged items into clusters 204 that correspond to the candidate tags 150. The food-ordering service 106 may allow an operator, merchant 108, and/or customer 110 to provide input indicating that a particular tagged item included in a first cluster 304 corresponding to a first candidate tag 150 belongs in a second cluster 304 corresponding to a second candidate tag 150. In such examples, the food-ordering service 106 may assign the particular tagged item with the second candidate tag 150. Thus, the tagging of items 148 may be improved using cluster visualization, in some examples.

Figure 9:
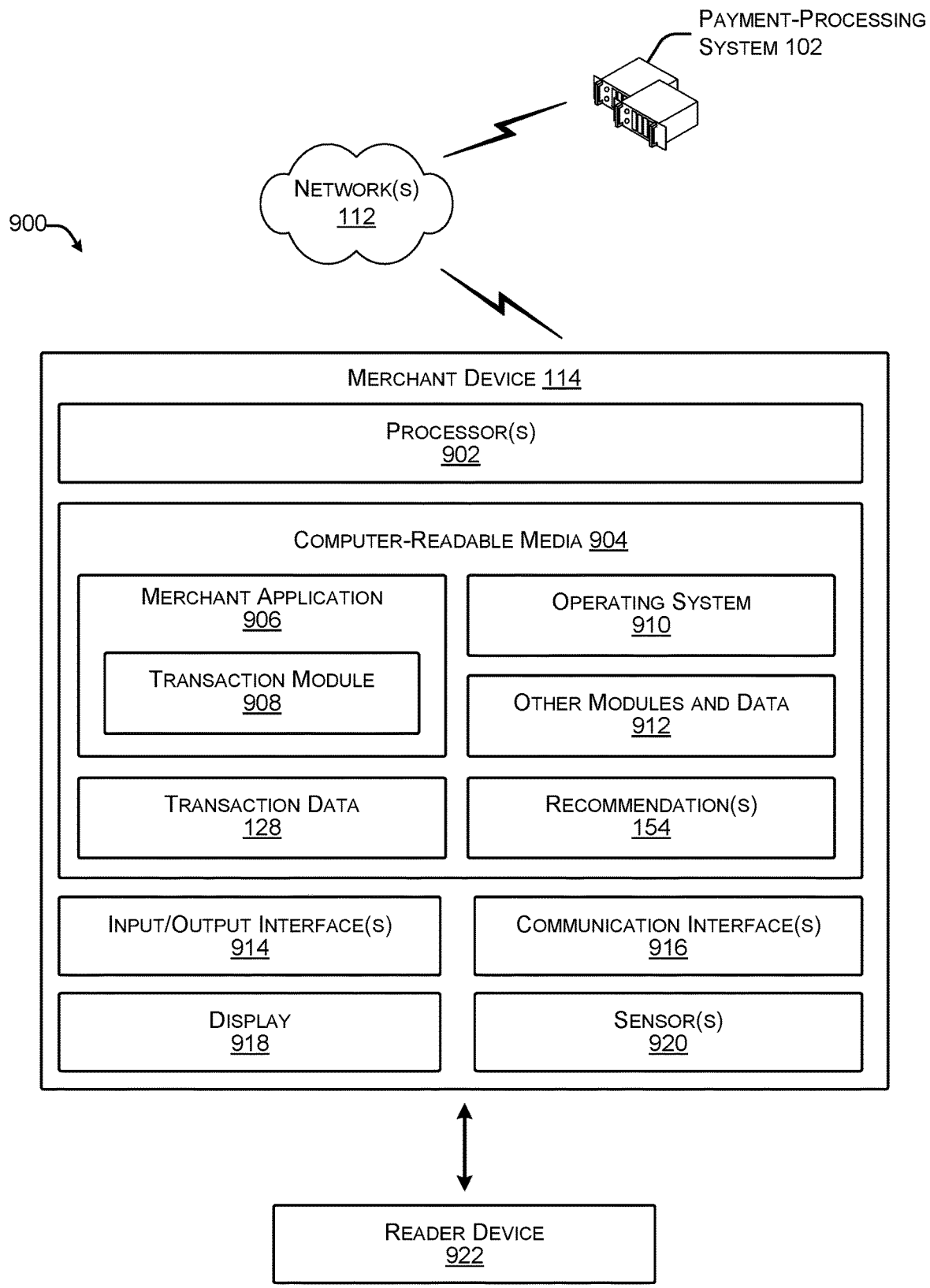
FIG. 9 illustrates an example merchant device for enabling techniques as described herein.

FIG. 9 illustrates an illustrative block diagram 900 of an example merchant device 114 for enabling techniques as described herein. the merchant device 114 communicates with the payment-processing system 102 (e.g., servers) via network(s) 112 (e.g., the Internet, cable network(s), cellular network(s), wireless network(s) (e.g., Wi-Fi) and wired network(s), as well as close-range communications such as Bluetooth®, Bluetooth® low energy, and the like). In at least one example, such as the example illustrated in FIGS. 1, 9, and 10, a reader device 922 can be external to, and wirelessly coupled to, the merchant device 114. However, in an alternate example, the reader device 922 can be integral to, or integrated with, the merchant device 114. While a single merchant device 114 and reader device 922 are illustrated, in additional or alternate examples, the techniques described herein can be performed using multiple merchant devices and/or reader devices.

In at least one example, the merchant device 114 can be any suitable type of computing device, e.g., portable, semi-portable, semi-stationary, or stationary. Some examples of the merchant device 114 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 114 includes one or more processors 902, one or more computer-readable media 904, one or more communication interfaces 916, and one or more input/output (I/O) devices 914. Each processor 902 can itself comprise one or more processors or processing cores. For example, the processor(s) 902 can be implemented as one or more microprocessors, microcomputers, microcontrollers, digital signal processors, central processing units, state machines, logic circuitries, and/or any devices that manipulate signals based on operational instructions. In some examples, the processor(s) 902 can be one or more hardware processors and/or logic circuits of any suitable type specifically programmed or configured to execute the algorithms and processes described herein. The processor(s) 902 can be configured to fetch and execute computer-readable processor-executable instructions stored in the computer-readable media 904.

Depending on the configuration of the merchant device 114, the computer-readable media 904 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 904 can include, but is not limited to, RAM, ROM, EEPROM, flash memory, solid-state storage, magnetic disk storage, optical storage, and/or other computer-readable media technology. Further, in some examples, the merchant device 114 can access external storage, such as RAID storage systems, storage arrays, network attached storage, storage area networks, cloud storage, or any other medium that can be used to store information and that can be accessed by the processor(s) 902 directly or through another computing device or network. Accordingly, the computer-readable media 904 can be computer storage media able to store instructions, modules or components that can be executed by the processor(s) 1004. Further, when mentioned, non-transitory computer-readable media exclude media such as energy, carrier signals, electromagnetic waves, and signals per se.

The computer-readable media 904 can be used to store and maintain any number of functional components that are executable by the processor(s) 902. In some implementations, these functional components comprise instructions or programs that are executable by the processor(s) 902 and that, when executed, implement operational logic for performing the actions and services attributed above to the merchant device 114. Functional components stored in the computer-readable media 904 can include a merchant application 906, which can include a transaction module 908.

The merchant application 906 can provide POS functionality to the merchant device 114 to enable the merchant to accept payments from one or more customers at a POS location. For example, the merchant can use the merchant device 114 to accept payments through various different types of payment instruments, e.g., payment cards, electronic payment, cash or check, cryptocurrency, etc. at the POS location from the one or more customers. Furthermore, as described above, in some examples, the merchant can use the merchant device 114 to accept identifiers and/or utilize the identifiers and/or personal identifiers associated with payment data for processing transactions. In at least one example, the transaction module 908 can present various user interfaces to enable a merchant to conduct transactions, receive payments, and so forth. In at least one example, the transaction module 908 can send data associated with the payments (e.g., transaction data) to the payment-processing system 102.

Furthermore, the computer-readable media 904 can include additional functional components, such as an operating system 910 for controlling and managing various functions of the merchant device 114 and for enabling basic user interactions. In addition, the computer-readable media 904 can also store data, data structures and the like, that are used by the functional components. Depending on the type of the merchant device 114, the computer-readable media 904 can also optionally include other functional components and data, such as other modules and data 912, which can include programs, drivers, etc., and the data used or generated by the functional components. Further, the merchant device 114 can include many other logical, programmatic and physical components, of which those described are merely examples that are related to the discussion herein. In at least one example, the merchant device 114 can include the transaction data 128 and the recommendations 154, as described above with reference to FIG. 1.

The communication interface(s) 916 can include one or more interfaces and hardware components for enabling communication with various other devices, such as over the network(s) 112 or directly. For example, communication interface(s) 916 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant device 114 can further include the one or more I/O devices 914. The I/O devices 914 can include speakers, a microphone, a camera, and various user controls (e.g., buttons, a joystick, a keyboard, a keypad, etc.), a haptic output device, and so forth.

In at least one example, merchant device 114 can include a display 918. Depending on the type of computing device(s) used as the merchant device 114, the display 918 can employ any suitable display technology. For example, the display 918 can be a liquid crystal display, a plasma display, a light emitting diode display, an OLED (organic light-emitting diode) display, an electronic paper display, or any other suitable type of display able to present digital content thereon. In some examples, the display 918 can have a touch sensor associated with the display 918 to provide a touch-screen display configured to receive touch inputs for enabling interaction with a graphic interface presented on the display 918. Accordingly, implementations herein are not limited to any particular display technology. Alternatively, in some examples, the merchant device 114 may not include the display 918, and information can be presented by other means, such as aurally. In some examples, the display 918 may present transaction data 128 as a transaction is occurring, and/or to confirm a transaction being completed. Additionally, the display 918 may display the recommendations 154 received from the payment-processing system 102 as described herein.

In addition, the merchant device 114 can include sensor(s) 920. The sensor(s) 920 can include a GPS device able to indicate location information. Further, the sensor(s) 1022 can include, but are not limited to, an accelerometer, gyroscope, compass, proximity sensor, camera, microphone, and/or a switch. Additionally, the merchant device 114 can include various other components that are not shown, examples of which include removable storage, a power source, such as a battery and power control unit, a barcode scanner, a printer, a cash drawer, and so forth.

In addition, in some examples, the merchant device 114 can include or can be connectable to a reader device 922, for reading payment instruments and/or identifiers associated with payment objects. In some examples, as described above, the reader device 922 can plug in to a port in the merchant device 114, such as a microphone/headphone port, a data port, or other suitable port. The reader device 922 can include a read head for reading a magnetic strip of a payment card, and further can include encryption technology for encrypting the information read from the magnetic strip. Additionally or alternatively, the reader device 922 can be a Europay, MASTERCARD®, VISA® (EMV) payment reader, which in some examples, can be embedded in the merchant device 114. Moreover, numerous other types of readers can be employed with the merchant device 114 herein, depending on the type and configuration of the merchant device 114. As described above, in some examples, the reader device 922 can be configured to read identifiers from payment objects (e.g., RFID-enabled wristbands, non-payment cards, etc.). In such examples, the merchant device 114 can receive an instruction to activate such functionality (e.g., from the payment-processing system 102) and can send an instruction to the reader device to activate such functionality. In another example, the payment-processing system can send the instruction directly to the reader device 922.

Figure 10:
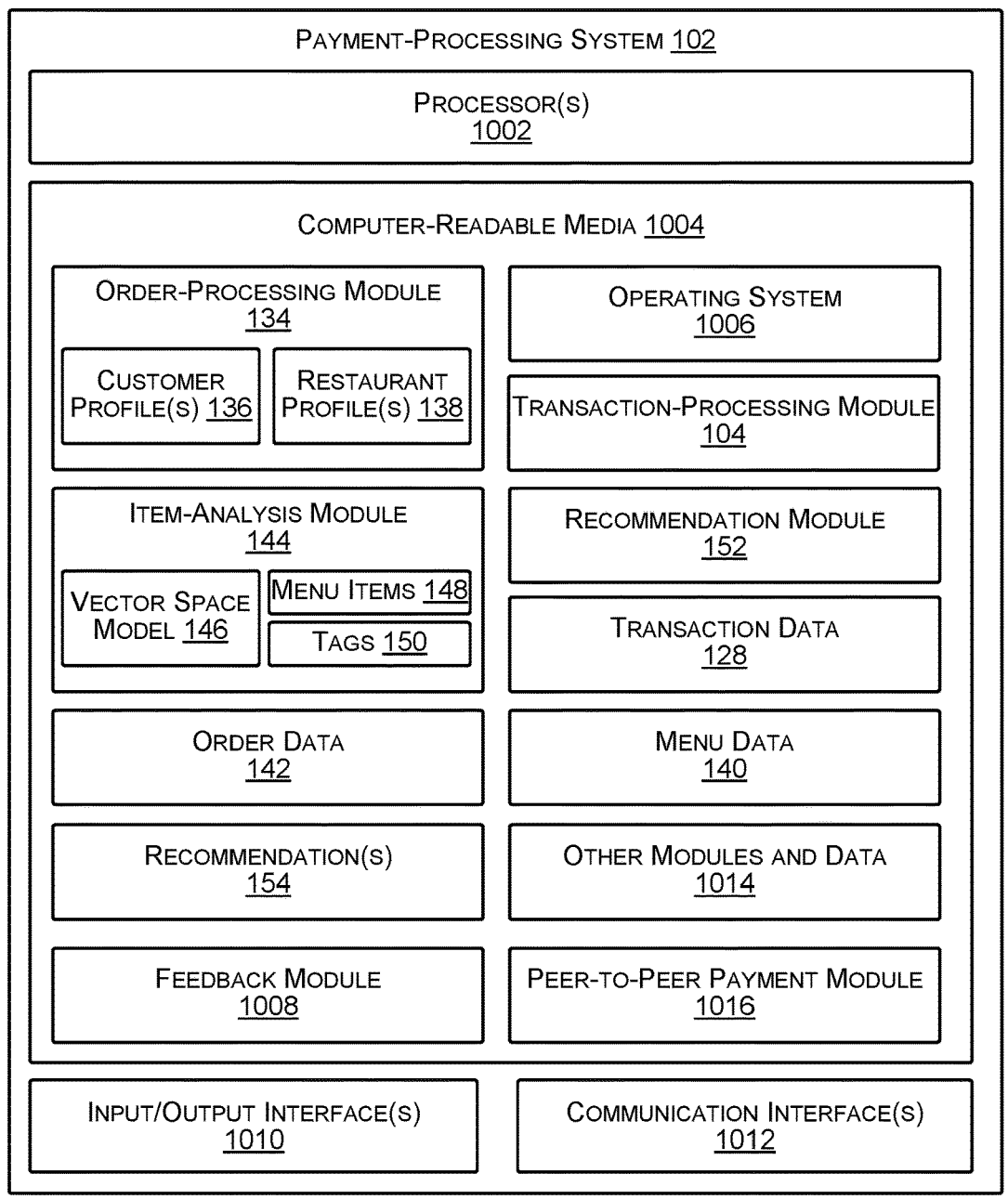
FIG. 10 illustrates an example payment-processing system for enabling techniques as described herein.

FIG. 10 illustrates a block diagram 1000 of an example payment-processing system 102 for enabling techniques as described herein. Generally, the payment-processing system 102 may comprise a distributed network of computing devices, including servers. The servers can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the payment-processing system 102 as being present in a single location, these components and data can alternatively be distributed across different computing devices and different locations in any manner. Consequently, the functions can be implemented by one or more server computing devices, with the various functionality described above distributed in various ways across the different computing devices. The payment-processing system 102 can include multiple servers that can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the payment-processing system 102 can include one or more processors 1002, one or more computer-readable media 1004, one or more communication interfaces 1012, and one or more input/output devices 1010. Each processor 1002 can be a single processing unit or a number of processing units, and can include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For example, the processor(s) 1002 can be one or more hardware processors and/or logic circuits of any suitable type specifically programmed or configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include a feedback module 1008 that receives feedback data from the customer devices 124, as described with respect to FIG. 7. The feedback module 1008 may collect the feedback data from the customer devices 124 and perform various techniques for determining whether the feedback is positive or negative, such as by utilizing a trained vector space model 146.

The computer-readable media 1004 can include volatile and nonvolatile memory and/or removable and non-removable media implemented in any type of technology for storage of information, such as computer-readable instructions, data structures, program modules, or other data. Such computer-readable media 1004 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the servers of the payment-processing system 102, the computer-readable media 1004 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1004 can be used to store any number of functional components that are executable by the processors 1002. In many implementations, these functional components comprise instructions or programs that are executable by the processors 1002 and that, when executed, specifically configure the one or more processors 1002 to perform the actions attributed above to the food-ordering service 106 and/or payment-processing system 102. Functional components stored in the computer-readable media 1004 can include the order-processing module 134, the item-analysis module 144 (components of the food-ordering service 106), the transaction-processing module 104, and the recommendation module 152. At least some of the functionality associated with the order-processing module 134, the item-analysis module 144 (components of the food-ordering service 106), the transaction-processing module 104, and the recommendation module 152 is described above with reference to FIGS. 1-8. Additional functional components stored in the computer-readable media 1004 can include an operating system 1006 for controlling and managing various functions of the servers of the payment-processing system 102.

In at least one example, the computer-readable media 1004 can include or maintain other functional components and data, such as other modules and data 1014, which can include programs, drivers, etc., and the data used or generated by the functional components. At least some of the data described above with reference to FIGS. 1-8 can be included and/or maintained in the other modules and data 1014. In additional or alternate examples, one or more of the databases can be remotely located from the servers and data stored in such databases can be accessible to the servers, as shown in FIG. 10. Further, the servers of the payment-processing system 102 can include many other logical, programmatic and physical components, of which those described above are merely examples that are related to the discussion herein.

The communication interface(s) 1012 can include one or more interfaces and hardware components for enabling communication with various other devices, such as over the network(s) 112. For example, communication interface(s) 1012 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The servers of the payment-processing system 102 can further be equipped with various input/output (I/O) devices 1010. Such I/O devices 1010 can include a display, various user interface controls (e.g., buttons, joystick, keyboard, mouse, touch screen, etc.), audio speakers, connection ports and so forth.

In some examples, the payment-processing system 102 may include a peer-to-peer (p2p) payment module 1016 that allows customers 110 to make payments to, and share payments with, other customers 110. For example, the customers 110 may download an application associated with the payment-processing system 102 that allows them to find other customers 110 that utilize the p2p payment module 1016 and pay, send money, and accept payments from the other customers 110. For instance, if two customers 110 eat a meal together, but only one of the customers 110 has money to pay for the meal, the other customer 110 can later use the p2p payment module 1016 to send money to the paying customer 110 to help pay for the meal. The payment-processing system 102 may provide this service to customers 110 by allowing customers 110 to link or otherwise associate bank accounts, credit cards, and/or other payment means, with accounts that they have created for the p2p payment module 1016. Thus, when the customers 110 may payments, the funds sent to the receiving customer 110 will be taken from the payment means that is linked to the account of the customer 110 making the payment. Similarly, if a customer 110 receives a payment, the payment may be added to the payment means (e.g., bank account balance) once the funds are received. In this way, the payment-processing system 102 may provide a p2p payment module 1016 to customers 110 to allow the customers 110 to pay, and receive payments from, other customers 110.

In some examples, the p2p payment module 1016 may allow the customers 110 to tag or otherwise indicate a purpose of the payment to another customer 110. For instance, if two customers 110 eat a meal at a restaurant called "Pete's Pizza" and one of the customers 110 has to pay the other back for the meal, the customer 110 may tag the payment with "For: Pizza at Pete's" to let the receiving customer 110 know what the payment is for. In some examples, the item-analysis module 144 may utilize this text data to create the vector space module 146, and to ultimately determine the recommendations 154 described herein. For instance, the p2p payment module 1016 may generate transaction data 128 that indicates types of food, specific menu items, etc., purchased by customers 110 in a geographic area 132. Similar to the techniques described above, the text data in the transaction data 128 may be converted into the vector space model 146, and utilized to generate the recommendations 154 as described herein (e.g., recommendation of a geographic area to place a restaurant). In this way, transaction data 128 obtained via a p2p payment module 1016 may be utilized to generate and/or populate a vector space model 146 in similar ways as the transaction-processing module 104 and/or order-processing module 134 have been described as performing herein.

In some instances, the vector space model 146 may create hybrid vectors such that the vectors representing the words/phrases may have additional dimensions corresponding to, for example, item price, number of times an item has been ordered, and so forth. The extra dimensions for the vectors in the vector space model 146 may enrich the vector space to allow the payment-processing system 102 to not only find menu items 148 that are conceptually similar, but also find menu items 148 that are similar in price, popularity, and so forth. For instance, the vector space module 146 may be utilized to cluster the multi-dimensional vectors according to the other dimensions, such as price and/or popularity, such that menu items 148 with similar popularity and/or price may be clustered together.

The techniques and features described herein may be managed or organized according to various computing architectures and devices, implemented using a variety of computing processes, and/or involve varying systems of computing devices. In some examples, the services and systems described herein, such as the payment-processing system 102, transaction-processing module 104, and/or the food-ordering service 106, may be implemented in various computing architectures, systems, and/or platforms.

For example, the systems and services described herein may be implemented utilizing a secure, cloud-based computing platform that can scale-up and/or scale-down computing resources and storage on a permanent or an as-needed basis. The cloud-based computing platform may support the services and systems described herein using computing resources that are located in geographically disparate data centers (or other facilities) that house and manage computing devices and associated components. Users of the systems and services described herein may access the supporting computing resources provided by the data centers of the cloud-based computing platform over any wired and/or wireless network, which can be a wide area communication network ("WAN"), such as the Internet, an intranet or an Internet service provider ("ISP") network or a combination of such networks. The data centers may house computing resources, such as servers, routers, storage devices, etc., which are interconnected using one or more networks, such as local-area networks ("LANs"), or any other networking topology known in the art that connects resources in data centers. The computing resources provided by the cloud-based computing platform may include virtual machine ("VM") instances, data storage resources, database resources, networking resources, network services, and other types of computing resources. The cloud-based computing platform may include a scaling service configured to determine a number of concurrent requests being received from customer devices 124, merchant devices 114, etc., and scale-up or scale-down the computing resources to serve the concurrent requests. For example, the scaling service may spin up additional VM instances to execute software to serve requests, such as to process individual transactions on behalf of merchants and customers, to process orders received from customers via the food-ordering service 106, and any other type of request. The cloud-based computing platform may then execute the appropriate software in the VM instances, and store any transaction data 128 (and other metadata associated with requests or events) in scalable storage.

Further, the payment-processing system 102 may utilize various types of automation and/or machine-learning (ML) techniques to perform various functions described herein. For instance, many of the techniques for analyzing data to make Intelligent decisions and/or recommendations may be performed using one or more ML algorithms to identify patterns in data, learn or train models to analyze data, and/or make predictions based on observed characteristics in data. The ML algorithms may be performed using general processors, and/or on specialized ML processors or hardware. The ML algorithms may include any type of supervised algorithm, unsupervised algorithm, and/or reinforced algorithm. The ML algorithms may allow the payment-processing system 102 to learn from data and improve user experience without human intervention by learning functions or models that intelligently map various inputs to appropriate outputs, such as by learning the structure in labeled and/or unlabeled data. The ML algorithms utilized herein can include any type of algorithm or model, such as linear regression, logistic regression, Naïve Bayes classification, neural networks (such as convolution neural networks (CNNs), artificial neural networks (ANNs), k-nearest neighbor (K-NN), etc.), clustering algorithms (such as k-means clustering), random forests, decision trees, support vector machines, and/or any other ML algorithm.

The ML algorithms may receive various types of data as inputs that can be obtained using the systems and services described herein, such as transaction data 128, menu data 140, an/or order data 142, and learn from the data to make intelligent predictions. As some specific examples, the payment-processing system 102 may utilize one or more ML models to analyze the transaction data 128 overtime and identify transaction trends. For example, the ML models may receive transaction data 128 that includes timestamps and dates of when the transactions occurred for the merchants 108. The payment-processing system 102 may program the ML models to identify transaction trends, such as times of the day, week, year, etc. associated with high/low levels of transactions for the merchants 108. Once trained, the ML models may be utilized to provide recommendations based on those trends, such as when to order more inventory, how much inventory to order based on previous sales, and so forth.

In some examples, the payment-processing system 102 may utilize and/or support various types of payment-transaction technologies, such as peer-to-peer (p2p) payment applications, card schemes, and/or digital, virtual, and/or cryptocurrency schemes, such as Blockchain, Bitcoin, and/or any other cryptocurrency.

For instance, the payment-processing system 102 may utilize blockchain systems, and/or operate blockchain systems, to implement at least portions of the techniques described herein. Generally, a blockchain may comprise a growing list of records, or "blocks," that are linked to one another using cryptography. In a blockchain, each clock contains a cryptographic hash of the previous block, a timestamp of when the block was created, and transaction data representing a transaction between multiple entities. The growing list of records, or the "distributed ledger," is a public transaction ledger that is distributed to nodes in a peer-to-peer network to decentralize the list of records and record transactions between parties in a verifiable and permanent way. In some examples, the food-ordering service 106 may utilize a private blockchain that records transactions between participating entities, such as customers 110 and merchants 108 that subscribe for use of the food-ordering service 106. In this way, transaction data 128 representing transactions between the customers 110 and the merchants 108 may be stored such that personal information for the parties is verifiable, but private (e.g., through the use of hashing functions).

In some examples, the payment-processing system 102 may utilize a public blockchain to implement a portion of the food-ordering service 106, such as the performance of the transactions between the merchants 108 and customers 110. For instance, the merchants 108 and customers 110 may utilize a public blockchain to record transactions, and the payment-processing system may verify the identities of the parties, and simply perform the interfacing and actual delivery of the items from the deliver restaurants 120 and the customers 110. For instance, the food-ordering service 106 may be a node in a public blockchain and identify transactions in the blockchain involving a customer 110 and a merchant 108. Further, the food-ordering service 106 may receive, such as through the delivery application 126, the order data 142 (e.g., items, number of items, delivery address, delivery time, etc.) for the order, and cause a courier 122 to transport the items from the delivery restaurants 120 to the customers 110. In this way, blockchain may be utilized for at least a portion of the food-ordering service 106 and/or transaction processing module 104.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

The invention claimed is:

1. A method, implemented by a server associated with a payment processing service that processes transactions between delivery restaurants, dine-in restaurants, and customers, the method comprising:
   receiving first data representing menus from the delivery restaurants that include items offered for delivery to the customers;
   generating, utilizing a machine-learning (ML) model and based at least in part on the menus, first numerical representations of the items in a vector space;
   generating a set of candidate tags that correspond to generic names for individual items of the items;
   generating utilizing the ML model and the set of candidate tags, second numerical representations of the set of candidate tags in the vector space;
   generating second data, based at least in part on a comparison of the first numerical representations and the second numerical representations, representing similarity scores between individual numerical representations of the first numerical representations and the second numerical representations;
   assigning, based at least in part on the similarity scores, each item of the items a candidate tag from the set of candidate tags to generate tagged items;
   analyzing transaction histories for a group of the customers receiving deliveries in a geographic area to identify a number of the tagged items purchased by each customer in the group of the customers;
   determining, based at least in part on the number of the tagged items purchased by each customer in the group of the customers, diversity scores for the group of the customers indicating a diversity of the tagged items that were purchased by a customer in the geographic area;
   determining, based at least in part on the diversity scores, an aggregated diversity score associated with the geographic area; and
   causing, based at least in part on the aggregated diversity score, a recommendation to be displayed on a merchant device associated with a merchant that the geographic area is a favorable location to establish a dine-in restaurant.

2. The method as claim 1 recites, wherein the generic names of the items correspond to cuisine types, further comprising:
   identifying, based at least in part on the tagged items, a first menu of a first merchant that includes first items of a same cuisine type as second items included in a second menu of a second merchant;
   identifying at least one of the first items included in the first menu that is not included in the second menu; and
   providing another recommendation to another merchant device associated with the second merchant to add the at least one of the first items to the second menu.

3. The method as claim 1 recites, wherein the generic names of the items correspond to cuisine types, further comprising:
   identifying a group of the tagged items that correspond to a particular cuisine type of the cuisine types;
   receiving additional menus for dine-in restaurants that are located within the geographic area or within a threshold distance of the geographic area;
   determining, based at least in part on the additional menus, that less than a threshold of the dine-in restaurants provide items corresponding to the particular cuisine type; and
   determining that the merchant to which the recommendation is provided is associated with a menu that includes items that correspond to the particular cuisine type.

4. A system associated with a payment processing service that processes transactions between merchants and customers, the system comprising:
   one or more processors; and one or more computer-readable media comprising one or more instructions, that when executed by the one or more processors, cause the one or more processors to perform operations comprising:

receiving first data representing one or more menus that include one or more items offered for sale at one or more restaurants associated with one or more of the merchants, wherein a menu of the one or more menus corresponds to a restaurant of the one or more restaurants and the menu comprises at least one item of the one or more items;

generating, utilizing a machine-learning (ML) model and based at least in part on the one or more menus, one or more first numerical representations of the one or more items;

generating one or more second numerical representations by inputting one or more candidate tags into the ML model, the one or more candidate tags corresponding to one or more generic names;

generating second data representing one or more similarity scores between individual numerical representations of the one or more first numerical representations and the one or more second numerical representations by comparing similarities between the one or more first numerical represents and the one or more second numerical representations;

assigning, based at least in part on the one or more similarity scores, individual items of the one or more items a candidate tag from the one or more candidate tags resulting in one or more tagged items;

analyzing transaction data for a group of the customers associated with a geographic area, wherein the transaction data represents transactions by the group of the customers to purchase at least one of the one or more tagged items; and causing, based at least in part on the analyzing the transaction data, a recommendation to be displayed on a merchant device associated with a merchant.

5. The system as claim 4 recites, wherein the providing the recommendation includes recommending that the geographic area is a favorable location to establish a restaurant.

6. The system as claim 4 recites, the operations further comprising:

identifying the merchant as operating a mobile restaurant having a menu that includes at least one of the one or more items that corresponds to at least one of the one or more tagged items;

determining, based at least in part on the transaction data, at least one of a popular time of day or a popular day of a week at which to sell the at least one of the one or more tagged items in the geographic area; and wherein the providing the recommendation includes recommending that the merchant schedule to establish their mobile restaurant in the geographic area according to the at least one of the popular time of the day or the popular day of the week.

7. The system as claim 4 recites, the operations further comprising:

determining, based at least in part on the transaction data, one or more diversity scores for the group of the customers indicating a diversity of the one or more tagged items that were purchased by a customer associated with the geographic area; and determining, based at least in part on the one or more diversity scores, an aggregated diversity score associated with the geographic area, wherein the providing recommendation includes recommending that the geographic area is a favorable location to establish a restaurant based at least in part on the aggregated diversity score associated with the geographic area.

8. The system as claim 4 recites, wherein:

the one or more generic names of the items correspond to at least one of cuisine types or dietary-restriction types;

the one or more menus comprise one or more first menus from delivery restaurants; and the operations further comprising:

analyzing one or more second menus for one or more dine-in restaurants that are located within the geographic area or within a threshold distance to the geographic area;

determining, based at least in part on the one or more second menus, that less than a threshold of the one or more dine-in restaurants provide items corresponding to at least one of a particular cuisine type or a particular dietary-restriction type; and determining that the merchant, to which the recommendation is provided is associated with a menu that includes one or more items that correspond to the at least one of the particular cuisine type or the particular dietary-restriction type.

9. The system as claim 4 recites, wherein:

at least one of the one or more candidate tags includes a first generic name corresponding to a first cuisine type and a second generic name corresponding to a second cuisine type;

determining the one or more second numerical representations representing the one or more candidate tags includes calculating an average numerical value based on a first numerical value representing the first generic name and a second numerical value representing the second generic name; and comparing the one or more first numerical values with the one or more second numerical values includes comparing at least one of the one or more first numerical values with the average numerical value to determine at least one of the one or more similarity scores.

10. The system as claim 4 recites, the operations further comprising:

clustering the one or more tagged items into one or more clusters that correspond to the one or more candidate tags;

receiving input indicating that a particular tagged item included in a first cluster corresponding to a first candidate tag belongs in a second cluster corresponding to a second candidate tag; and assigning the particular tagged item with the second candidate tag.

11. The system as claim 4 recites, the operations further comprising:

obtaining a corpus of text representing words; and utilizing the corpus of text to train a vector space model such that vectors representing related words are closer in the vector space than vectors representing non-related words, wherein the one or more first vectors and the one or more second vectors are determined at least partly using the vector space model.

12. A system associated with a payment processing service that processes transactions between delivery restaurants and customers, the system comprising:

one or more processors; and one or more computer-readable media comprising one or more instructions, that when executed by the one or more processors, cause the one or more processors to perform operations comprising:

receiving first data representing one or more menus from the delivery restaurants that include one or more items offered for delivery to the customers;

generating, utilizing a machine-learning (ML) model and based at least in part on the one or more menus, a vector space comprising one or more first numerical values representing individual items of the one or more items;

generating one or more second numerical values for cuisine types for the one or more items by inputting one or more candidate tags into the ML model such that the second numerical values represent the one or more candidate tags;

generating second data representing one or more similarity scores between individual values of the one or more first numerical values and the one or more second numerical values by comparing the one or more first numerical values and the one or more second numerical values;

assigning, based at least in part on the one or more similarity scores, each item of the one or more items to a cuisine type from the cuisine types resulting in one or more classified items;

analyzing transaction data for a group of the customers in a geographic area that received deliveries including at least one of the one or more classified items from a delivery restaurant; and causing, based at least in part on the analyzing the transaction data, a recommendation to be displayed on a merchant device associated with a merchant.

13. The system as claim 12 recites, the operations further comprising:

identifying, based at least in part on the analyzing the transaction data, a price for a particular classified item, wherein the providing the recommendation to the merchant device includes recommending a recommended price for a menu item corresponding to the particular classified item to be included in a menu for the merchant.

14. The system as claim 12 recites, the operations further comprising:

identifying, based at least in part on the analyzing the transaction data, a popularity score for a particular classified item, wherein the providing the recommendation includes recommending, based at least in part on the popularity score, to the merchant to include a menu item corresponding to the particular classified item in a menu offered by the merchant.

15. The system as claim 12 recites, the operations further comprising:

determining, based at least in part on the analyzing the transaction data, diversity scores for the group of the customers indicating a diversity of the classified items that were purchased by a customer associated with the geographic area; and determining, based at least in part on the diversity scores, an aggregated diversity score associated with the geographic area, wherein the providing the recommendation includes recommending that the geographic area is a favorable location to establish a restaurant or to begin providing delivers of items from a delivery restaurant based at least in part on the aggregated diversity score associated with the geographic area.

16. The system as claim 12 recites, wherein the one or more items comprise one or more first items, the operations further comprising:

obtaining a menu associated with the merchant that includes one or more second items offered for sale by the merchant;

determining one or more third numerical values for individual items of the one or more second items;

determining, based at least in part on the one or more second numerical values and the one or more first numerical values, that individual items of the one or more second items correspond to one or more of the cuisine types of the one or more classified items; and determining, based at least in part on the analyzing the transaction data, a popularity score for the one or more of the cuisine types in the geographic area, wherein the recommendation is provided to the merchant device based at least in part on the popularity score for the one or more of the cuisine types in the geographic area that correspond to individual items of the one or more second items included in the menu associated with the merchant.

17. The system as claim 12 recites, the operations further comprising:

identifying the merchant as operating a mobile restaurant having a menu that includes at least one item that corresponds to at least one of the one or more classified items;

determining, based at least in part on the transaction data, at least one of a popular time of day or a popular day of a week at which to sell the at least one of the one or more classified items in the geographic area; and wherein the providing the recommendation comprises recommending that the merchant schedule to establish their mobile restaurant in the geographic area according to the at least one of the popular time of the day or the popular day of the week.

18. The system as claim 12 recites, the operations further comprising:

receiving, from customer devices associated with the group of the customers, feedback data associated with the deliveries including the at least one of the one or more classified items;

determining one or more third numerical values representing the feedback data;

comparing the one or more third numerical values against one or more fourth numerical values of a vector space model that represent positive feedback and negative feedback; and determining, based at least in part on the comparing, a positivity score associated with the geographic area, wherein the recommendation that the geographic area is a favorable location is provided to the merchant device, based at least in part on the positivity score.

* * * * *